(12) United States Patent
Calvo et al.

(10) Patent No.: US 12,403,690 B2
(45) Date of Patent: Sep. 2, 2025

(54) FAULT DIAGNOSIS IN A CONTINUOUS INK JET PRINTER

(71) Applicant: Linx Printing Technologies Limited, St. Ives (GB)

(72) Inventors: Miguel Calvo, St Ives (GB); John Green, St Ives (GB); Stephen Eric Baldwin, St Ives (GB)

(73) Assignee: Linx Printing Technologies Limited (GB)

( * ) Notice: Subject to any disclaimer, the term of this patent is extended or adjusted under 35 U.S.C. 154(b) by 284 days.

(21) Appl. No.: 18/114,827

(22) Filed: Feb. 27, 2023

(65) Prior Publication Data

US 2023/0202169 A1    Jun. 29, 2023

Related U.S. Application Data

(63) Continuation of application No. PCT/GB2021/052175, filed on Aug. 23, 2021.

(30) Foreign Application Priority Data

Aug. 29, 2020 (GB) ..................... 2013607

(51) Int. Cl.
*B41J 2/125* (2006.01)
*B41J 2/165* (2006.01)
(Continued)

(52) U.S. Cl.
CPC ........... *B41J 2/125* (2013.01); *B41J 2/16579* (2013.01); *B41J 2/2142* (2013.01); *B41J 29/393* (2013.01);
(Continued)

(58) Field of Classification Search
CPC ...... B41J 2/125; B41J 2/16579; B41J 2/2142; B41J 29/393; B41J 29/46; B41J 2/02; B41J 2/08; B41J 2002/022
See application file for complete search history.

(56) References Cited

U.S. PATENT DOCUMENTS 6,003,980 A    12/1999  Sheinman et al.
7,735,981 B2   6/2010   Vaeth et al.
(Continued)

FOREIGN PATENT DOCUMENTS

EP    0 888 219 A1    1/1999
EP    0888219 B1  *  5/2000  .............. B41J 2/165
(Continued)

OTHER PUBLICATIONS

PCT International Search Report and Written Opinion for International Application No. PCT/GB2021/052175 mailing date Dec. 23, 2021, 15 pages.
(Continued)

Primary Examiner — Yaovi M Ameh
(74) Attorney, Agent, or Firm — Foley & Lardner LLP

(57) ABSTRACT

A system (93) monitors the break-up phase of an electrostatic deflection continuous ink jet printer to identify phase instability likely to be caused by a partial blockage of the jet-forming device (17). It ignores alternations between adjacent phase positions and brief unrepeated periods of phase disruption. Preferably it ignores phase changes caused by changes in other operational parameters of the printer, such as variations in ink pressure. Monitoring may be done in the printer (99) or in an external system (93), (95).

21 Claims, 10 Drawing Sheets

(51) Int. Cl.
*B41J 2/21* (2006.01)
*B41J 29/393* (2006.01)
*B41J 29/46* (2006.01)
B41J 2/02 (2006.01)
B41J 2/08 (2006.01)

(52) U.S. Cl.
CPC .................. *B41J 29/46* (2013.01); *B41J 2/02* (2013.01); *B41J 2002/022* (2013.01); *B41J 2/08* (2013.01)

(56) References Cited

U.S. PATENT DOCUMENTS

| | | |
|---|---|---|
| 2004/0181712 A1 | 9/2004 | Taniguchi et al. |
| 2004/0207676 A1 | 10/2004 | Yamada et al. |
| 2007/0257971 A1 * | 11/2007 | Jeanmaire .................. B41J 2/09 347/82 |
| 2009/0213168 A1 | 8/2009 | Ito |
| 2016/0098234 A1 * | 4/2016 | Weaver .................. G06F 3/1234 358/1.15 |
| 2017/0144448 A1 | 5/2017 | Smith |

FOREIGN PATENT DOCUMENTS

| | | | | |
|---|---|---|---|---|
| GB | 2250235 A | * | 6/1992 | .............. B41J 2/135 |
| WO | WO-89/03768 A2 | | 5/1989 | |
| WO | WO-2019/199674 A1 | | 10/2019 | |

OTHER PUBLICATIONS

UK Search Report for Application No. GB2013607.3 mailing date Mar. 2, 2021, 2 pages.

* cited by examiner

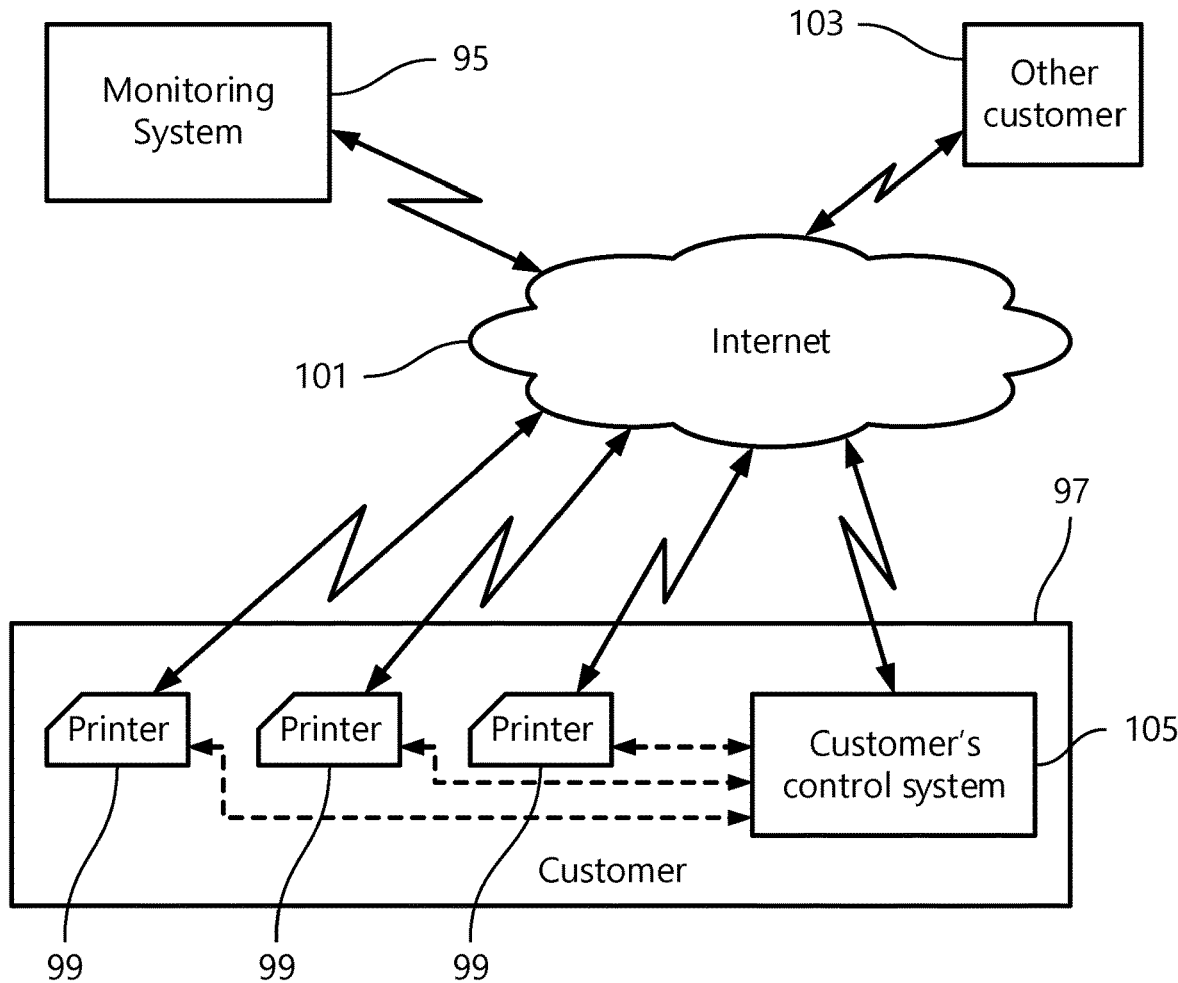

FAULT DIAGNOSIS IN A CONTINUOUS INK JET PRINTER

CROSS-REFERENCE TO RELATED APPLICATIONS

The present application is a continuation of international application PCT/GB2021/052175, filed Aug. 23, 2021, which claims priority to GB App. No. 2013607.3, filed Aug. 29, 2020, both of which are incorporated herein by reference in their entireties and for all purposes.

FIELD OF THE INVENTION

The present invention relates to a monitoring system and a monitoring method for an electrostatic deflection continuous ink jet printer, for example an industrial printer suitable for printing onto a succession of objects carried past the printer on a conveyor in an industrial filling, packing or processing line. Typically the objects are products such as manufactured articles or packaged food stuffs and the printer is used to print product and batch information, "use by" dates etc. The present invention also relates to a program for implementing the monitoring method.

In the operation of an electrostatic deflection continuous ink jet printer, a continuous jet of ink drops is formed at a print head of the printer by allowing pressurised ink to leave a jet-forming device (ink gun) through a small hole. The ink jet is formed as an unbroken stream of ink as it leaves the ink gun through the jet-forming hole, but it breaks into drops after travelling a short distance. The print head comprises an arrangement of electrodes to trap electric charges on some or all of the ink drops and to create an electrostatic field to deflect the charged drops. Typically the arrangement of electrodes includes a charge electrode, the ink is electrically conductive, and the drops will be charged by the influence of a voltage on the charge electrode. The charged drops will usually be deflected by the electrostatic field generated by a pair of deflection electrodes. The drops are deflected in flight so that only some drops are used for printing. Drops of ink that are not required for printing are caught by a gutter and are normally returned to an ink tank within a printer body of the printer. Usually the print head is connected to the printer body by a flexible conduit (sometimes called an umbilical) which is typically from 1 m to 6 m long. The print head may be separable from the printer body. Usually the print head and the umbilical are provided as a print head assembly that can be connected to and disconnected from the printer body.

A pressure vibration is applied to the ink before it leaves the ink gun to form the ink jet. This controls the way in which the jet breaks into drops. In order to ensure that charges are trapped on drops correctly, it is important for the voltage on the charge electrode to be changed at the correct phase position relative to the separation of drops from the unbroken portion of the ink jet. Therefore an electrostatic deflection continuous ink jet printer will usually perform repeated checks of the phase position of the break-up of the jet into drops. This phase position (sometimes known as the break-up phase) is usually measured relative to the waveform of the applied pressure vibration.

BACKGROUND

WO 89/03768 describes various aspects of the design and operation of an electrostatic deflection continuous ink jet printer. It describes a start-up sequence in which, after the ink is pressurised by the ink pump, the valves in the ink system are set to a state to allow the ink jet to be formed. Subsequently, the printer attempts to determine the time of flight of the ink jet (which provides a measure of the speed of the ink jet) and the break-up phase of the ink jet. If it fails to determine these, the printer performs a routine to suck air in through the jet-forming nozzle on the assumption that the nozzle is likely to be blocked.

US 2016/0098234 proposes a system for remote servicing an industrial printer such as a continuous ink jet printer. Sensor measurements (and also other data) are sent from the printer to a servicing centre. US 2016/0098234 lists a large number of sensor parameters that may be sent, including selected phase, phase rate of change, profile and phase threshold. Based on the sensor data and other data, a system at the servicing centre is configured to issue a fault or a warning if appropriate. The system may receive sensor data and other data from a large number of printers and may use historical data to determine correlations between data such as environmental data and fault data. A long list of examples of faults and warnings is provided. It is also suggested that the sensor data can be used to predict potential failures or other faults. For example, if pump speed is changing over time it may indicate that the pump is wearing and may fail, or it may become known from historical data that if the pressure drop across a filter reaches a certain point the printer will fail within a week 99% of the time. A table of example predictive faults is given, in which one entry gives "phase rate of change" as sensor data and "break up instability" as the corresponding potential fault.

SUMMARY OF THE INVENTION

In embodiments of the present invention a monitoring system monitors the break-up phase of an electrostatic deflection continuous ink jet printer to identify phase instability likely to be caused by a partial blockage of the jet-forming device. Preferably it ignores alternations between adjacent phase positions and brief un-repeated periods of phase disruption. Preferably it ignores or compensates for phase variations caused by printer operations, such as adding solvent to the ink, or caused by changes in other printer parameters, such as changes in ink pressure. Monitoring may be done in the printer or in an external system.

An aspect of the present invention provides a phase stability monitoring system for an electrostatic deflection continuous ink jet printer which receives printer data from which the monitoring system is able to determine phase data (a) indicating which of a set of possible phase positions includes the break-up phase of an ink jet of the printer at each of a succession of analysis times and/or (b) indicating the change of the break-up phase of the ink jet from one of the possible phase positions to another, analyses the phase data (optionally together with further data relating to the operation of the printer, e.g. data indicating another operational parameter of the printer such as ink pressure or change in ink pressure downstream of an ink pump or other ink pressurising means) to determine whether the break-up phase is stable or unstable. Preferably the said analysis does not use an instantaneous rate of change of phase and does not solely use an average rate of change of phase (the change of phase over a period of time divided by the length of the period). Preferably if the system determines that the break-up phase is unstable it outputs a diagnostic conclusion that the printer probably has a partially blocked jet-forming device and/or a recommendation for action that is likely to clean and/or unblock the jet-forming device.

The printer data may provide phase information to the monitoring system only when there is a change of the break-up phase of the ink jet from one of the possible phase positions to another. Such data can nevertheless enable the monitoring system to determine which possible phase position includes the break-up phase at each analysis time since it can be assumed that the break-up phase is included in the same possible phase position as previously for as long as no new phase information is received.

The phase stability monitoring system may be provided in the printer or it may be provided in a system external to the printer such as a remote monitoring system e.g. operated by a service organisation that maintains the printer, or the phase stability monitoring system may be provided partly in the printer and partly in an external system.

Another aspect of the present invention provides a phase stability monitoring method comprising analysing phase data (optionally together with further data relating to the operation of the printer, e.g. data indicating another operational parameter of the printer such as ink pressure or change in ink pressure downstream of an ink pump or other ink pressurising means) to determine whether the break-up phase is stable or unstable, the phase data (a) indicating which of a set of possible phase positions includes the break-up phase of an ink jet of the printer at each of a succession of analysis times and/or (b) indicating the change of the break-up phase of the ink jet from one of the possible phase positions to another. Preferably the said analysis does not use an instantaneous rate of change of phase and does not solely use an average rate of change of phase (the change of phase over a period of time divided by the length of the period). Preferably the method comprises outputting, in the case it is determined that the break-up phase is unstable, a diagnostic conclusion that the printer probably has a partially blocked jet-forming device and/or a recommendation for action that is likely to clean and/or unblock the jet-forming device.

The method may be performed in the printer or it may be performed in a system external to the printer such as a remote monitoring system e.g. operated by a service organisation that maintains the printer, or the method may be performed partly in the printer and partly in an external system.

If the diagnostic conclusion and/or recommendation is output at the printer, it may be accompanied by the transmission of a message to a remote device, such as a push notification or SMS to a mobile phone. This enables the operator of the printer to be alerted even if they are not at the printer when the diagnostic conclusion and/or recommendation is output.

If the diagnostic conclusion and/or recommendation is output at a system external to the printer such as a remote monitoring system, it may be accompanied by the automatic transmission of a message to the operator or another person at the organisation that uses the printer. Alternatively the diagnostic conclusion and/or recommendation may be output only at the system, and a person at the organisation that operates the system can then contact the operator, contact another person at the user organisation, and/or take other action. This enables a service organisation that operates the system to provide a service response that can take account of other factors such as the history of problems at that printer or at printers of the user organisation. The person at the organisation that operates the system can contact an appropriate person in a personal manner, such as by a phone call, if this is deemed more likely to result in appropriate corrective action being taken.

Break-up phase is usually detected in an electrostatic deflection continuous ink jet printer as being in one of a pre-determined number of possible positions, each of which covers a respective portion of the 360° phase cycle. For example, there may be 16 possible phase positions (so that the phase position can be represented by a 4-bit binary number), each of which covers 22.5° of the phase cycle.

Because the phase data relates to which possible phase position includes the break-up phase of an ink jet of the printer at each of a succession of analysis times and/or changes of the break-up phase of the ink jet from one of the possible phase positions to another, it is not possible to determine an instantaneous rate of change. An average rate of change (the change of phase over a period of time divided by the length of the period) is not a useful measure, at least when taken on its own, because an average taken over a very short period (e.g. five seconds or less) fails to distinguish between unstable break-up and normal variations in break-up phase whereas an average taken over a longer period tends to be small because the phase cannot change in the same direction indefinitely so that change over a longer period does not reflect the degree of variation in phase that may have occurred during that period. Therefore the analysis preferably does not use rate of change of phase on its own and may not use rate of change of phase at all.

Preferably the analysis does not use solely the frequency of changes of phase, and may not use the frequency of changes of phase at all.

There are various ways in which the data can be analysed to determine whether the break-up phase is stable or unstable. The said analysis may use at least one of: (i) the size (e.g. measured in number of possible phase positions) of the change in break-up phase between successive analysis times; (ii) the size of the range of possible phase positions, or the total number of different possible phase positions, that have included the break-up phase over a set period (preferably at least 5 seconds and more preferably at least 10 seconds); (iii) whether successive changes of the break-up phase from one of the possible phase positions to another are in the same direction or in opposite directions; (iv) the average or total of the absolute values of changes in break-up phase over a set period of time; (v) the average of the absolute values of changes in break-up phase relative to the number of times the break-up phase changed from one possible phase position to another in a set period of time; (vi) the frequency with which the break-up phase changes (e.g. number of changes in a given period of time) possibly without regard to the direction and/or the size of each change. In practice, it will usually be most useful to use at least one of (a) the size, in number of possible phase positions or in angle of phase, of changes in break-up phase from one analysis time to the next; (b) the range of variation of the break-up phase within a set period of time; or (c) whether successive changes in phase are in the same direction as each other, in methods of analysis to determine whether the break-up phase is unstable.

Typically an electrostatic deflection continuous ink jet printer comprises a means (usually an ink pump) for pressurising ink, and the jet-forming device is connected to receive pressurised ink that can be driven out of the jet-forming device by its pressure to form the ink jet. The ink jet will naturally break into drops. The place where this happens is the break-up position. The break-up distance (also known as break-up length) is distance between the beak-up position and a fixed point, usually the place where the ink jet leaves the jet-forming device. Typically an electrostatic deflection continuous ink jet printer comprises an arrangement of electrodes to trap electric charges on selected drops of ink (also known as charging the drops of ink) and creating an electrostatic field to deflect the charged drops of ink. There may be a charge electrode to charge the drops and deflection electrodes to form the electrostatic field. Typically a pressure modulation, in the form of a vibration or pressure oscillation, is applied to the ink before it is driven out of the jet-forming device in order to influence the manner in which the ink jet breaks into drops. The break-up phase of the ink jet is usually defined as the phase at which the ink jet breaks into drops relative to the pressure modulation or a signal used to create the pressure modulation. The break-up phase is monitored in order to allow a signal used to charge the drops to be applied with a controlled phase relationship with the break-up of the ink jet into drops. It may be important to control this phase relationship in order to ensure that successive drops are charged correctly.

In a first embodiment, the data can be analysed to determine the frequency of change of the break-up phase over time without regard to the direction of the change (so that all changes are treated as being in the same direction and successive changes in opposite directions do not reduce the frequency of change). If this frequency of change exceeds a threshold value for longer than a minimum period of time or exceeds the threshold repeatedly within a given period of time, it is determined that the break-up phase is unstable. Alternatively, the average frequency of change over a given period may be determined, and if this average exceeds a threshold it is determined that the break-up phase is unstable.

This analysis is based on an expected behaviour of the break-up phase in which it may change slowly over time e.g. as solvent is lost from the ink and the ink viscosity increases as a result, and may change by a larger amount over a brief time period as solvent is added to the ink to reduce the viscosity again. If there is an extended period of large or rapid change beyond what would result from an addition of solvent to the ink, or repeated large or rapid changes more frequently than would result from successive additions of solvent, it can be concluded that the break-up phase has become unstable.

In a second embodiment, the data can be analysed to determine the direction and/or the size of changes in the phase position. If within a given period of time there are more than a set number of successive changes in the same direction and/or more than a set number of changes by more than one possible phase position at a time, it is determined that the break-up phase is unstable. Alternatively the average size of phase changes (e.g. the average of the number of possible phase positions by which the phase has moved in each change) over a given period of time or a given number of phase changes is compared with a threshold, and if the threshold is exceeded it is determined that the break-up phase is unstable. For example, the size of each change in break-up phase (measured as number of possible phase positions by which the break-up phase has changed) may be divided by the total number of changes in break-up phase to give an average size of the changes, and this average may be taken over a set number of changes or over a set period. If this average size of the changes of phase exceeds a threshold, it is determined that the break-up phase is unstable.

This analysis is based on an expected behaviour of the break-up phase in which it tends to remain constant over time, or only change very slowly. Therefore if anything other than an alternation between adjacent possible phase positions (which may occur if the actual phase of the jet break-up is very close to the boundary between two possible phase positions) and a very slow change of phase position occurs, it can be concluded that the break-up phase has become unstable.

It is common that during normal operation of an electrostatic deflection continuous ink jet printer, factors that affect the break-up phase only change very slowly, except for changes that arise in response to changes in viscosity (which changes as solvent evaporates from the ink and is replenished, and may also change if the temperature at the printer changes). Typically, as the viscosity changes, the ink pressure is changed in order to keep the speed of the ink jet constant. The change in viscosity affects the manner in which the jet breaks into drops, which results in a change of break-up distance, and because the jet speed is kept constant this creates a change in break-up phase. Since the change in viscosity affects the manner in which the jet breaks into drops, it also typically alters the preferred amplitude of the pressure modulation that is applied to the ink to control the manner in which it breaks into drops. Therefore an automated system to control the modulation amplitude may respond to changes in viscosity by changing the modulation amplitude. This in turn alters the break-up length and therefore the break-up phase. Some printers are set up in such a way that the change in break-up phase resulting directly from a change in viscosity and the change in break-up phase resulting from changing the modulation amplitude largely cancel each other with the result that the break-up phase does not change significantly even as viscosity changes. Therefore the expected behaviour of such a printer is that the break-up phase tends to remain constant over time.

In a third embodiment, usable in circumstances in which data is analysed in a system external to the printer and that receives data from a group of printers comprising multiple printers, the data is analysed to compare values from different printers for a parameter such as average rate of change of phase over a given time, range of different phase positions in a given time, or number of different phase positions in a given time. A printer whose behaviour with regard to this parameter is significantly different from the normal for the group of printers is determined to have an unstable break-up phase. The behaviour of a printer may be judged to be significantly different if its value for the parameter is significantly different for longer than a set period of time or is significantly different more often than is normal. "Significantly different" may be defined by any convenient statistical analysis. For example, the values for the parameter may be obtained for all of the printers in the group of printers, the standard deviation of those values may be obtained, and a value that is more than 3 standard deviations from the mean may be taken to be significantly different. "More often than is normal" may be defined in an analogous manner.

These embodiments can be regarded as examples of determining that the break-up phase is unstable by comparing the actual behaviour of the printer, as indicated by the phase data, with an expected behaviour and determining that the break-up phase is unstable if the actual behaviour is different from the expected behaviour. As noted above, the first embodiment discussed above is based on an expected behaviour of the break-up phase in which it may change slowly over time, and may change by a larger amount over a brief time period. The second embodiment discussed above is based on an expected behaviour of the break-up phase in which it tends to remain constant over time. The third embodiment discussed above is based on an expected behaviour that the printer will not behave significantly differently from what is normal for the group of printers.

These definitions of the expected behaviour are simple and may result in a determination that the break-up phase is unstable when it is in fact stable. Therefore more detailed and accurate definitions of the expected behaviour are preferred, as discussed below. The first and second embodiments discussed above are based on models, prepared in advance, of the expected behaviour of the printer. However, the more detailed definitions of expected behaviour will typically require a more detailed understanding of the manner in which the printer operates and be based on more detailed models of the expected behaviour, and so require more effort to create. A definition of expected behaviour based on the actual observed behaviour of all the printers in the group of printers, as used in the third embodiment discussed above, has the advantage that it is not necessary to create in advance any model of the expected behaviour of the printer.

Even the simple definitions of expected behaviour in the first to third embodiments discussed above are likely to result in the determination that the break-up phase is unstable on most occasions when that is in fact the case. A common cause of an unstable break-up phase is the presence of a partial blockage of the ink flow at the ink gun (the jet-forming device), most commonly a partial blockage at the nozzle. Partial blockages at the ink gun (especially if the blockage is at the nozzle) can usually be cleared by simple action that can be taken by the operator.

The break-up phase is monitored in order to allow a charge signal used to charge the drops (typically a signal applied to a charge electrode) to be applied with a controlled phase relationship with the break-up of the ink jet into drops. This enables the charge signal to be changed at the correct phase position, relative to the break-up of the ink jet, to ensure that the correct level of charge is trapped on each drop. If the phase monitoring system and the charge signal control system are both able to track changes in break-up phase adequately, small and slow changes in the break-up phase do not result in a serious reduction in print quality. However, it is difficult for the charge signal control system to respond adequately to very large or very rapid changes in phase. If phase instability is caused by a partial blockage at the ink gun, a movement, growth or other change in whatever is causing the partial blockage may result in the phase instability becoming worse with the result that consistent acceptable print quality can no longer be provided. In an extreme case, the blockage could become total or so great that no effective jet can be formed, terminating the ability of the printer to print. In such cases, the printer is no longer printing properly and it is necessary to stop the conveyor that is carrying the items past the printer to be printed onto. If this conveyor is part of a packing, filling or other processing line, it may be necessary to stop the entire line. If such events occur in an unplanned manner, it can be very disruptive for the operation of the site where the printer is located.

Since partial blockages at the ink gun can usually be cleared by simple action that can be taken by the operator, a diagnostic conclusion that the printer probably has a partially blocked jet-forming device and/or a recommendation for action that is likely to clean and/or unblock the jet-forming device, output in response to a determination that the break-up phase is unstable, is likely to enable the operator to avoid a significant proportion of events in which the printer ceases to be able to print properly. Action by the operator will still usually need the conveyor to be stopped, but this can be done in a planned manner, or the action can be done when the conveyor has been stopped for another reason, and so the disruption is much less than if the printer stops being able to print properly. Additionally, the action required by the operator will normally only take a few minutes and so the disruption caused by it will be brief.

Additionally, if the printer cannot print properly, it is common for the operator or other person at the organisation that uses the printer to call a service engineer. Therefore if the operator takes action that avoids an event in which the printer stops being able to print properly, a service engineer visit is avoided. This results in a cost saving for the service organisation that provides the service engineer.

Depending on the way that the printer operates, there may be several possible actions by the operator that could take that would be likely to clear a partially blocked jet-forming device. The solvent used to dilute the ink may also be used to form the jet, and/or suction may be applied to the inside of the jet-forming device so that air is sucked in through the hole through which the jet normally leaves the jet-forming device, during either or both of the ink jet stop process and the ink jet start process of the printer. If this is the case, the operator may instruct the printer to stop the ink jet and then start it again. The jet of solvent may dissolve or otherwise help to remove an obstruction. Suction applied to the inside of the jet-forming device may remove an obstruction. Alternatively the operator may instruct or perform an operation to dislodge an obstruction on the outside of the jet-forming device, at the hole where the ink jet normally leaves the jet-forming device, such as by physically contact, e.g. with a brush, and/or by washing with solvent.

In one embodiment, the system may initially respond to a determination that the break-up phase is unstable by outputting a first recommendation that the operator performs a first action (e.g. stop and restart the ink jet). If the break-up phase is still determined to be unstable a set period (maybe from one to six hours) after the first action has been performed the system may output a second recommendation, which may be a recommendation to repeat the first action or may be a recommendation to perform a second action (e.g. clean the ink gun). If the break-up phase is still determined to be unstable a set period after the second recommendation has been acted on the system may output a third recommendation if one is available, and so on until either it is determined that the break-up phase is stable or a rule being followed by the system determines that no further actions for the operator should be recommended and instead a service engineer should be sent to resolve the phase instability. In this way a service engineer is sent in a timely manner to fix the problem before the printer has become unusable, but the service engineer is only sent if actions by the operator have failed to resolve the detected phase instability. This provide both better service to the user of the printer and reduces the number of unnecessary service engineer visits.

More detailed and accurate models of the expected behaviour of the printer can allow the phase data from the printer (and optionally other data from the printer) to be analysed in a manner that more accurately detects instability in the break-up phase caused by a partially blocked jet-forming device.

For example, the way in which the data is analysed to determine whether the break-up phase is stable or unstable preferably does not determine that the break-up phase is unstable in response to a brief period of changes of phase that is not repeated frequently, especially if the change in phase during the period is small. Preferably, there is no determination that the break-up phase is unstable in response to a period of phase changes that contain a total variation of phase of no more than 45° of phase and that last for no longer than 15 seconds and that are not repeated within one hour.

The way the data is analysed may require that a parameter is averaged over a period of time or that the value of the parameter exceeds a threshold throughout, or for a specified proportion of, a given period of time. It may respond to a parameter meeting a criterion suggesting that the phase is unstable by incrementing a counter and only determine that the phase is unstable if the counter reaches a preset value, or it may combine values for the parameter over time in some other way so as to delay the determination that the phase is unstable. Preferably a pattern or other behaviour of changes of phase that, if sustained, will lead to a determination that the phase is unstable only leads to such a determination if it is sustained for at least 1 minute, more preferably at least 10 minutes, and it may be required that the pattern or other behaviour of changes of phase is sustained for longer, such as at least an hour or more.

This helps to avoid a determination that the phase is unstable being made in response to a temporary change in the pattern or other behaviour of changes of phase, resulting from some other aspect of the functioning of the printer that is automatically responded to by the printer.

For example, in most electrostatic deflection continuous ink jet printers the ink jet only breaks into drops in the desired manner if pressure modulation of the ink is applied with an amplitude within a particular range. If the amplitude of the pressure modulation is at the edge of its correct range, it is possible that small changes ink viscosity can lead to large changes in break-up phase. However, if the printer automatically checks and adjusts the amplitude of the pressure modulation to keep it away from the edge of its correct range, the amplitude of the pressure modulation will not remain at the edge of its correct range and so the large changes in the break-up phase will only be temporary. Therefore the model of expected behaviour of the printer may include an expectation that a temporary period of large changes in break-up phase, that was not sustained, is likely to be have been caused by a temporary error in the amplitude of the pressure modulation that was automatically corrected and this does not indicate that the break-up phase is unstable.

The model of expected behaviour of the printer may also include the expectation that the detected break-up phase may alternate between adjacent possible phase positions when the phase is stable, and this alternation may occur at any frequency and be regular or irregular. This behaviour is expected because the actual break-up phase may be very close to the boundary between two possible phase positions in the system for detecting the phase with the result that very small variations in phase, which do not indicate instability, or even variations in the detection process without any change in the actual phase, may result in the detected phase changing from one of the two possible phase positions to the other. Therefore the way in which the phase data is analysed should avoid determining that the phase is unstable purely in response to such an alternation between adjacent possible phase positions. This can be done in various ways. For example, the analysis may take into account the size of each change in phase and require changes by more than one possible phase position at a time in order to determine that the phase is unstable. This can be done by ignoring changes by one possible phase position entirely, or by requiring that the average size of phase changes exceeds some value that is greater than one possible phase positions in order to determine that the phase is unstable. Alternatively the analysis may take account of the direction of phase changes and require that there should be successive phase changes in the same direction in order to determine that the phase is unstable.

In another embodiment, the size of the range of possible phase positions that have included the break-up phase over a set period is determined. It may be determined that the break-up phase is unstable if the range of phase positions represents at least 45° in phase (2 possible phase positions if the 360° phase cycle is split into 16 possible phase positions) and preferably at least 67.5° in phase (3 possible phase positions if the 360° phase cycle is split into 16 possible phase positions) or more within a set period (which is preferably no greater than 5 minutes and is preferably at least five seconds, more preferably from ten seconds to two minutes, most preferably from fifteen seconds to a minute). Alternatively, a single such event may not be enough to determine that the break-up phase is unstable but if there are more than a set number of such events within a set period (preferably more than one or two events within a period of at least one minute and preferably no more than 30 minutes, or a greater number of events within a longer period such as more than 5 events in a hour) it may be determined that the break-up phase is unstable. The period of time in which the set number of events are required to occur should be longer than the period of time over which the range of phase positions are measured by a factor of at least the set number.

This embodiment is based on the expectation that large changes in break-up phase within a short period are unusual, but a partially obstructed jet-forming device may experience significant phase changes within a short time and this behaviour tends to be repeated. On the other hand, changes of phase by more than 45° within a few minutes are unlikely if the break-up phase is stable, and changes by more than one phase position within a few minutes are unlikely to occur frequently. Therefore a change in phase of at least 45°, and especially of 67.5°, in less than five minutes is likely to be caused by a partial blockage at the jet-forming device, especially if this occurs repeatedly. A serious partial blockage may cause changes in phase of up to 360° within 10 to 15 seconds, and this behaviour may repeat at intervals of about 30 seconds to a minute. Therefore a serious partial blockage will be detected if a determination of phase instability requires that the range of phase positions occurring within the set period represents at least 90° in phase (4 possible phase positions if the 360° phase cycle is split into 16 possible phase positions) or at least 135° in phase (6 possible phase positions if the 360° phase cycle is split into 16 possible phase positions) or even 180° in phase (8 possible phase positions if the 360° phase cycle is split into 16 possible phase positions). However, less serious partial blockages, that result in smaller changes in phase, can also result in a reduction in print quality and so it is preferred to base the determination of phase instability on a smaller change in phase if possible.

The model of expected behaviour may also include an expectation that certain printer operations or changes in certain printer parameters other than the break-up phase may cause a change in the break-up phase. For example, the addition of solvent to the ink circulating in the printer will change the viscosity of the ink, and this may lead to a change in the break-up phase. Accordingly, the way in which the data is analysed may use data indicating that an operation to add solvent will be, is being or has just been performed to ignore changes in the break-up phase that occur in a set period (e.g. 1 minute or five minutes) after the performance of the operation to add solvent.

As another example, if for any reason there is a sudden change in the pressure of the pressurised ink supplied to the jet-forming device, this can be expected to cause a corresponding sudden change in the break-up phase. It is normal to sense the pressure of pressurised ink in an electrostatic deflection continuous ink jet printer and so the analysis may use ink pressure data to prevent a determination that the break-up phase is unstable in response to a pattern of changes in break-up phase that corresponds to a pattern of changes in ink pressure that happen at the same time.

For example, the way in which the break-up phase changes in response to changes in ink pressure can be determined in advance, possibly by experiment for a particular model of printer. If a period of pressure changes is detected, the analysis could ignore any changes in phase that occur at the same time or with a brief time lag after the period of ink pressure changes if those phase changes match the changes that would be expected to result from the pressure changes. The analysis could also use the changes in phase that would be expected to result from the pressure changes as the expected phase behaviour and use differences from that expected behaviour in its determination of whether the break-up phase is unstable.

More simply, if there is a period of phase changes that is not just alternation between adjacent phase positions, and this period of phase changes occurs at the same time as or with a very brief time lag after a period of ink pressure changes, the period of phase changes could be regarded as probably resulting from the period of pressure changes and so the phase changes occurring in that period could be ignored in the analysis to determine whether the break-up phase is unstable. This does not require the way in which the break-up phase changes in response to changes in ink pressure to be known in advance Alternatively the analysis may not attempt to determine whether a pattern of changes in break-up phase matches a pattern of changes in ink pressure, or whether a period of changes in break-up phase matches a period of changes in ink pressure, but may instead ignore any changes in beak-up phase that take place at the same time as, or within a brief period after, a change in detected ink pressure.

Another aspect of the present invention provides a monitoring system arranged to: receive printer data of an electrostatic deflection continuous ink jet printer and obtain phase data from said printer data, said phase data being data (a) indicating which of a set of possible phase positions includes the break-up phase of an ink jet of the printer at each of a succession of analysis times and/or (b) indicating the change of the break-up phase of the ink jet from one of the possible phase positions to another; and analyse the phase data to determine whether there is a partial blockage at a jet-forming device of the printer and output an alert if it determines that there is a partial blockage at a jet-forming device of the printer, the monitoring system being arranged not to output an alert in response to alternations of the break-up phase between adjacent phase positions.

Another aspect of the present invention provides a monitoring system arranged to: receive printer data of an electrostatic deflection continuous ink jet printer and obtain phase data from said printer data, said phase data being data (a) indicating which of a set of possible phase positions includes the break-up phase of an ink jet of the printer at each of a succession of analysis times and/or (b) indicating the change of the break-up phase of the ink jet from one of the possible phase positions to another; and analyse the phase data, using at least one of: (a) the size, in number of possible phase positions or in angle of phase, of changes in break-up phase from one analysis time to the next; (b) the range of variation of the break-up phase within a set period of time; or (c) whether successive changes in phase are in the same direction as each other, to determine whether the break-up phase is unstable and output an alert if it determines that the break-up phase is unstable.

Another aspect of the present invention provides a monitoring system arranged to: receive printer data of an electrostatic deflection continuous ink jet printer and obtain phase data and other data from said printer data, said phase data being data (a) indicating which of a set of possible phase positions includes the break-up phase of an ink jet of the printer at each of a succession of analysis times and/or (b) indicating the change of the break-up phase of the ink jet from one of the possible phase positions to another and said other data being data relating to an operation other than forming the ink jet at a jet-forming device of the printer and/or data relating to a detected state, or a change in a detected state, in the printer other than the break-up phase; and analyse the phase data to determine whether the break-up phase is unstable and output an alert if it determines that the break-up phase is unstable, the monitoring system being arranged, under predetermined circumstances that are indicated to be present by the other data, not to output a said alert or to compensate the phase data or the manner of analysing the phase data for the predicted effect of the predetermined circumstances on the break-up phase.

Another aspect of the present invention provides a monitoring method comprising: receiving printer data of an electrostatic deflection continuous ink jet printer and obtaining phase data from said printer data, said phase data being data (a) indicating which of a set of possible phase positions includes the break-up phase of an ink jet of the printer at each of a succession of analysis times and/or (b) indicating the change of the break-up phase of the ink jet from one of the possible phase positions to another; and analysing the phase data to determine whether there is a partial blockage at a jet-forming device of the printer and outputting an alert in response to a determination that there is a partial blockage at a jet-forming device of the printer, and an alert not being output in response to alternations of the break-up phase between adjacent phase positions.

Another aspect of the present invention provides a monitoring method comprising: receiving printer data of an electrostatic deflection continuous ink jet printer and obtaining phase data from said printer data, said phase data being data (a) indicating which of a set of possible phase positions includes the break-up phase of an ink jet of the printer at each of a succession of analysis times and/or (b) indicating the change of the break-up phase of the ink jet from one of the possible phase positions to another; and analysing the phase data, using at least one of: (a) the size, in number of possible phase positions or in angle of phase, of changes in break-up phase from one analysis time to the next; (b) the range of variation of the break-up phase within a set period of time; or (c) whether successive changes in phase are in the same direction as each other, to determine whether the break-up phase is unstable and outputting an alert in response to a determination that the break-up phase is unstable.

Another aspect of the present invention provides a monitoring method comprising: receiving printer data of an electrostatic deflection continuous ink jet printer and obtaining phase data and other data from said printer data, said phase data being data (a) indicating which of a set of possible phase positions includes the break-up phase of an ink jet of the printer at each of a succession of analysis times and/or (b) indicating the change of the break-up phase of the ink jet from one of the possible phase positions to another and said other data being data relating to an operation other than forming the ink jet at a jet-forming device of the printer and/or data relating to a detected state, or a change in a detected state, in the printer other than the break-up phase; and analysing the phase data to determine whether the break-up phase is unstable and output an alert if it determines that the break-up phase is unstable, and in which, under predetermined circumstances that are indicated to be present by the other data, a said alert is not output or the phase data or the manner of analysing the phase data is compensated for the predicted effect of the predetermined circumstances on the break-up phase.

Further aspects of the invention and optional features are set out in the accompanying claims.

As noted above, the print head may be separable from the main body of the printer, and the term "printer" is used in the characterisations of the present invention to cover both an entire printer including a print head and a printer body without a print head.

BRIEF DESCRIPTION OF THE DRAWINGS

Embodiments of the present invention, given by way of non-limiting example, will be described with reference to the following drawings.

FIG. 6 shows an arrangement for receiving data sent by one or more printers and monitoring phase stability outside the printers.

FIG. 7 shows an example of a display that may be provided in a monitoring system of FIG. 6.

DETAILED DESCRIPTION OF EMBODIMENTS

Figure 1:
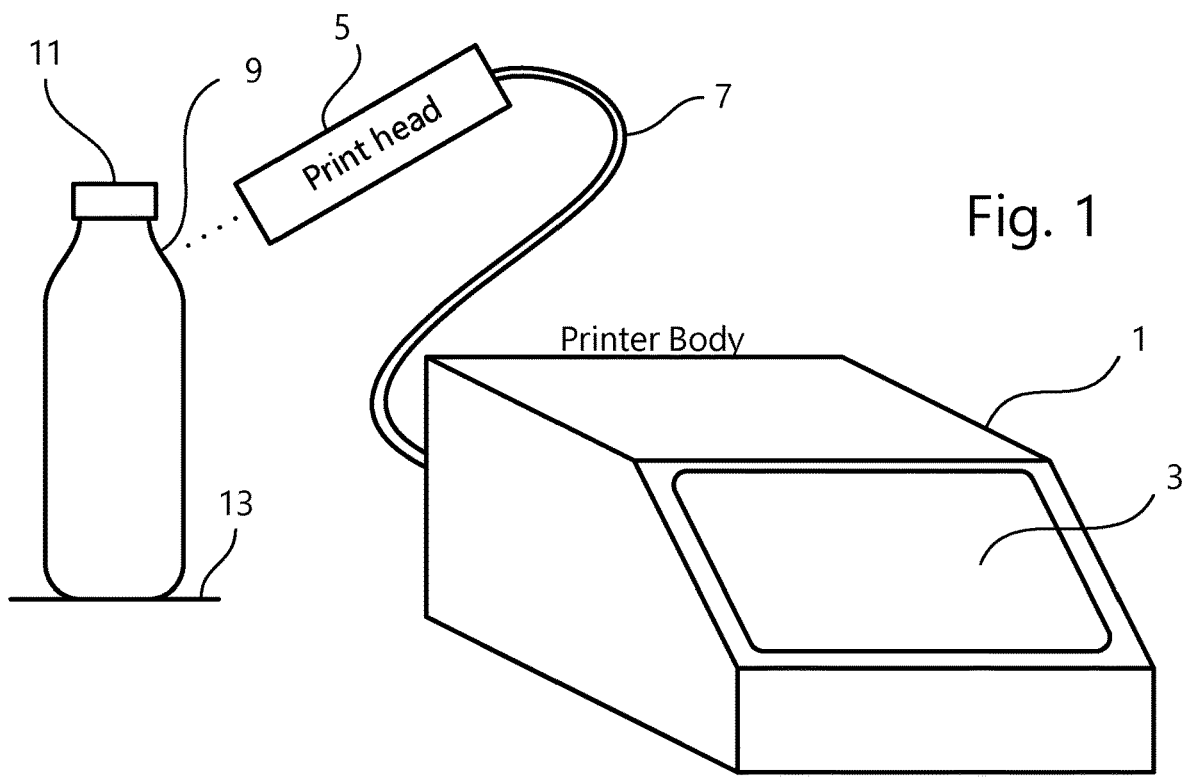
FIG. 1 shows an ink jet printer embodying the present invention.

FIG. 1 shows an electrostatic deflection type continuous ink jet printer. The printer forms a continuous jet of ink and has an arrangement of electrodes for charging drops of ink and deflecting the drops electrostatically in order to print a desired pattern. The main fluid and electrical components are housed within a printer body 1. An operator communicates with the printer via a touchscreen display 3. The ink jet is formed within a print head 5, which also includes the electrode arrangement for charging and deflecting the ink drops, and the print head 5 is connected to the printer body 1 by a flexible connection 7 known as a conduit or an umbilical. Drops of ink, deflected as necessary to create the desired pattern, travel from the print head 5 and strike the surface 9 of an object 11 conveyed past the print head 5, in order to print the desired pattern on the surface 9 of the object 11. The print head 5 and the umbilical 7 form a print head assembly that may be disconnectable from the printer body 1.

The printer is typically an industrial ink jet printer and is suitable to be used with a conveyor 13 that is external to the printer and conveys objects 11 past the print head to be printed onto. This is in contrast to a document printer that prints onto flat sheets, and which normally conveys the sheets itself rather than being used with a conveyor 13 that is external to the printer. The object 11 may be a manufactured product item, such as a bottle or can of drink, a jar of jam, a ready meal, or a carton containing multiple individual items. The desired pattern may comprise product information such as a batch number or a "use by" date. The printer may print onto the object 11 from the side so that the ink jet travels in a direction generally across the conveyor, or from above so that the ink jet travels in a direction generally towards the conveyor, or from any other angle. For example, bottles are normally printed onto from the side whereas ready meals are normally printed onto from above. In FIG. 1 the printer is set up to print from the side and partially above.

Figure 2:
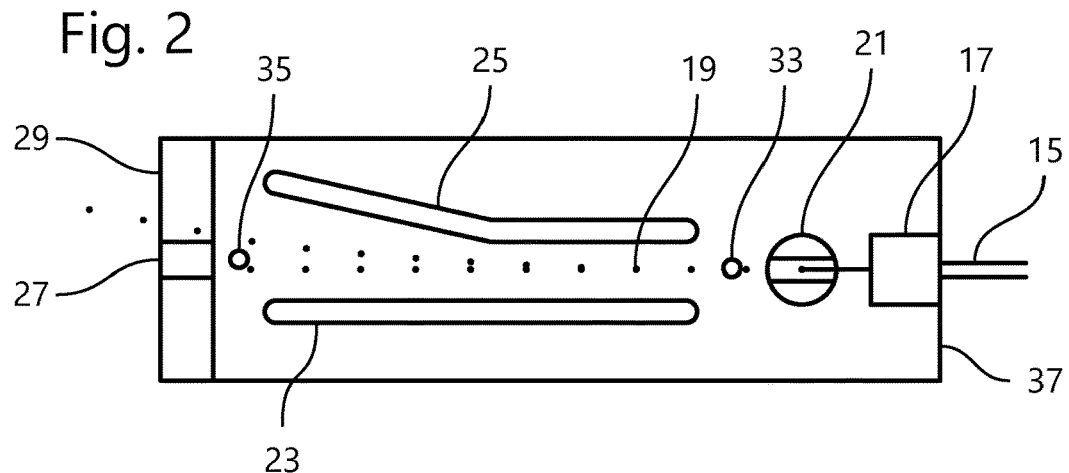
FIG. 2 is a schematic top view of the main components in the print head of the printer of FIG. 1.
Figure 3:
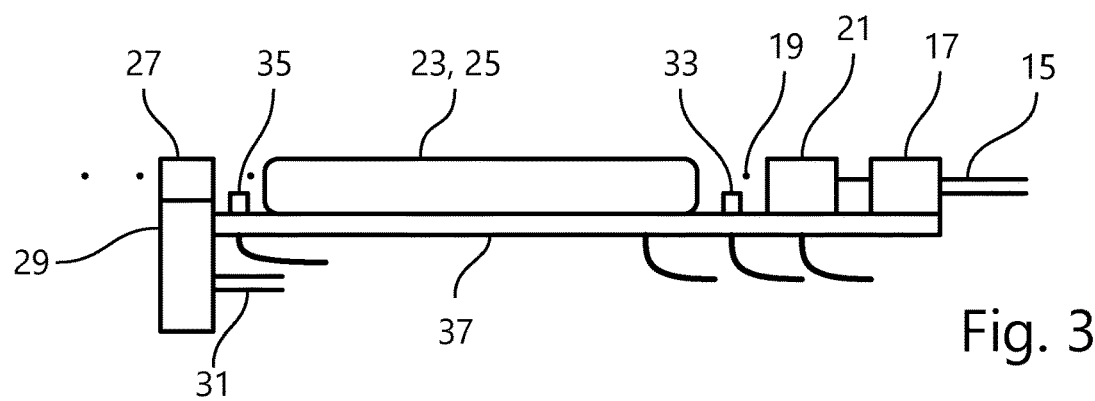
FIG. 3 is a schematic side view of the main components in the print head of the printer of FIG. 1.

FIG. 2 is a schematic top view and FIG. 3 is a schematic side view of the main components of the print head 5 in the region of the ink jet. The terms "top view" and "side view" represent conventional directions from which to view the print head on the assumption that the printer will print onto an object 11 from the side, and do not necessarily correspond to the orientation of the print head when in use. Pressurised ink, delivered from the printer body 1 through the umbilical 7, is provided via an ink feed line 15 to an ink gun (jet-forming device) 17. The pressure of the ink drives it out of the ink gun 17 through a small jet-forming hole to form an ink jet 19. Provided that pressurised ink is received by the ink gun 17 and any valves in the ink gun 17 are in the appropriate state, the ink jet 19 is formed continuously. Accordingly, this type of ink jet printer is known as a continuous ink jet printer, by contrast with a drop-on-demand printer in which a drop of ink is ejected only when a dot is to be printed.

Although the ink jet 19 leaves the ink gun 17 as a continuous unbroken stream of ink, it rapidly breaks into separate drops. The path of the ink jet passes through a slot in a charge electrode 21, which is positioned so that the ink jet 19 separates into drops while it is in the slot through the charge electrode 21. Other arrangements and other shapes of charge electrode 21 are possible, so long as the ink jet 19 is subject to the electric field of the charge electrode at the position where it separates into drops. The ink is electrically conductive and the ink gun 17 is held at a constant voltage (typically ground). Accordingly, any voltage applied to the charge electrode 21 induces a charge into the part of the ink jet 19 that is subject to the electric field in the slot of the charge electrode 21. As the ink jet 19 separates into drops, any such charge is trapped on the drops. In this way the amount of charge trapped on each drop can be controlled by the voltage on the charge electrode 21 and different amounts of charge can be trapped on different drops by changing the voltage on the charge electrode 21.

The ink jet 19 then passes between two deflection electrodes 23, 25. A large potential difference (typically several kilovolts, often 8 to 10 kV) is applied between the deflection electrodes 23, 25 to provide a strong electric field between them. Accordingly, the drops of ink are deflected by the electric field and the amount of deflection depends on the amount of charge trapped on each drop. In this way, each ink drop can be steered into a selected path.

As shown in FIG. 2, uncharged ink drops, which pass through the electric field without deflection, travel to a gutter 27 where they are caught. The gutter 27 is formed in an endpiece 29 of the print head 5. The endpiece 29, incorporating the gutter 27, is held at the same voltage (typically ground) as the ink gun 17 and removes the charge on any ink drops that reach it. Suction is applied to the inside of the gutter 27 by a gutter suction line 31, and so the ink received by the gutter 27 is sucked away and returned through the umbilical 7 to the printer body 1, for re-use. Drops of ink that are deflected by the field between the deflection electrodes 23, 25, so as to miss the gutter 27, leave the print head 5 and form printed dots on the surface 9 of the object 11.

A pressure vibration, known as "pressure modulation" or just "modulation", is applied to the ink inside the ink gun 17, typically by use of a piezoelectric device. In the absence of the pressure modulation, the ink jet 19 would naturally break into drops owing to Plateau-Rayleigh instability. By imposing the pressure modulation at an appropriate frequency, the drops are made to separate from the unbroken part of the ink jet at the modulation frequency. The appropriate frequency depends, in a known manner, on the speed of the ink jet 19 and on its diameter (and therefore on the size of the jet-forming exit hole by which the ink leaves the ink gun 17). An example of modulation is described in more detail in WO 89/03768.

In order for each ink drop to be charged to the correct level, the voltage on the charge electrode 21 should be stable and at the correct level at the moment when the drop separates from the unbroken part of the ink jet 19 and for a period of time beforehand while the ink that will form the drop is charging. If successive drops are to be charged to different levels of charge, the charge signal applied to the charge electrode will need to have a step shape and will need to change voltage at the ink jet break-up frequency, which will be the same as the modulation frequency. In order to charge each successive drop correctly, the voltage on the charge electrode 21 should be changed promptly after each drop has separated from the unbroken part of the ink jet 19 to allow time for the voltage on the charge electrode 21 to become stable at the correct level a sufficient time before the next drop separates. Therefore the phase of the charge signal needs to be correct relative to the ink jet break-up phase. The ink jet break-up phase has to be discovered, using a procedure known as phasing.

In an example of a phasing operation, a phasing signal is applied to the charge electrode 21. The phasing signal has a square wave shape with a small voltage for part only (typically 50%) of each period of the modulation signal (the signal applied to the piezoelectric device to create the pressure modulation). If the small voltage is present on the charge electrode 21 when an ink drop separates from the unbroken part of the ink jet, it will induce a small charge on the ink drop. Otherwise the ink drop is uncharged. A detection electrode 33, known as the phase electrode, is positioned just downstream of the charge electrode 21 and detects whether each drop is charged or not. By stepping the phasing signal through a series of possible phase positions relative to the modulation signal, and detecting which of the possible phase positions leads to charged ink drops and which led to uncharged ink drops, the ink jet break-up phase can be determined relative to the phase of the modulation signal. This enables the phase of the charge signal to be adjusted as necessary. There may for example be 16 possible phase positions, each spaced from the next by 22.5° in phase. The charge induced onto ink drops by the phasing signal is sufficiently small that the drops still pass to the gutter 27 even after slight deflection by the deflection field between the deflection electrodes 23, 25. An example of phasing is described in more detail in WO 89/03768.

A further detection electrode 35, known as the time-of-flight electrode, is positioned between the deflection electrodes 23, 25 and the gutter 27. This also detects charged drops in a similar manner to the phase electrode 33. The distance between the phase electrode 33 and the time-of-flight electrode 35 is known, and by measuring the time interval between detecting a charged drop on the phase electrode 33 and detecting the charged drop on the time-of-flight electrode 35 it is possible to measure the speed of the ink jet 19. In operation of the printer, the ink pressure is controlled to keep the detected time-of-flight at a desired value equivalent to the desired jet speed. An example of time-of-flight measurement and ink pressure control is described in more detail in WO 89/03768.

In FIGS. 2 and 3 the phase electrode 33 is shown between the charge electrode 21 and the deflection electrodes 23, 25, and the time-of flight electrode 35 is shown between the deflection electrodes 23, 25 and the gutter 27, but other arrangements are possible. For example, the phase electrode 33 and the time of flight electrode 35 may each be mounted on a deflection electrode as shown for example in WO 99/59822.

In order for the ink jet 19 to break into drops without creating smaller "satellite" drops between the main drops (which is usually not desired), the pressure modulation applied to the ink in the ink gun 17 should have an appropriate amplitude as well as an appropriate frequency. If the modulation amplitude is too low (under-modulation) or is too high (over-modulation), and satellite drops are beginning to be formed, the break-up length (the distance the ink jet 19 travels from the ink gun 17 before it breaks up into drops) is longer than if the modulation amplitude is correct. Since the jet speed is kept constant, the change in break-up length results in a change in break-up phase. Therefore it is possible to set the modulation amplitude to an appropriate value by a process known as auto-modulation in which the change in the break-up phase is monitored as the modulation amplitude is varied. For example, the modulation amplitude may initially be set art a value that is known to be too low, and the phasing operation is performed repeatedly while the modulation amplitude is increased step by step. At first the break-up phase will change in the direction corresponding to shorter break-up lengths as the modulation amplitude increases. At some point the break-up phase will begin to change in the opposite direction as the modulation amplitude begins to increase. This identifies a characteristic modulation amplitude close to the value at which over-modulation begins. The modulation amplitude for use in printing operations is then set as slightly less than this characteristic value. An example of an auto-modulation process is described in more detail in WO 89/03768.

The ink gun 17, the charge electrode 21, the phase electrode 33, the deflection electrodes 23, 25 and the time-of-flight electrode 35 are mounted on a baseboard 37 that ends at the endpiece 29. The gutter suction line 31 extends beneath the baseboard 37. The electrical connections for the charge electrode 21 the phase electrode 33, the deflection electrodes 23, 25 and the time-of-flight electrode 35 also extend beneath the baseboard 37, as shown in FIG. 3. The space above the baseboard 37 is closed by a removable print head cover. The space below the baseboard 37 is closed by the external body of the print head 5. The print head cover and the external body are not shown in FIGS. 2 and 3.

Figure 4:
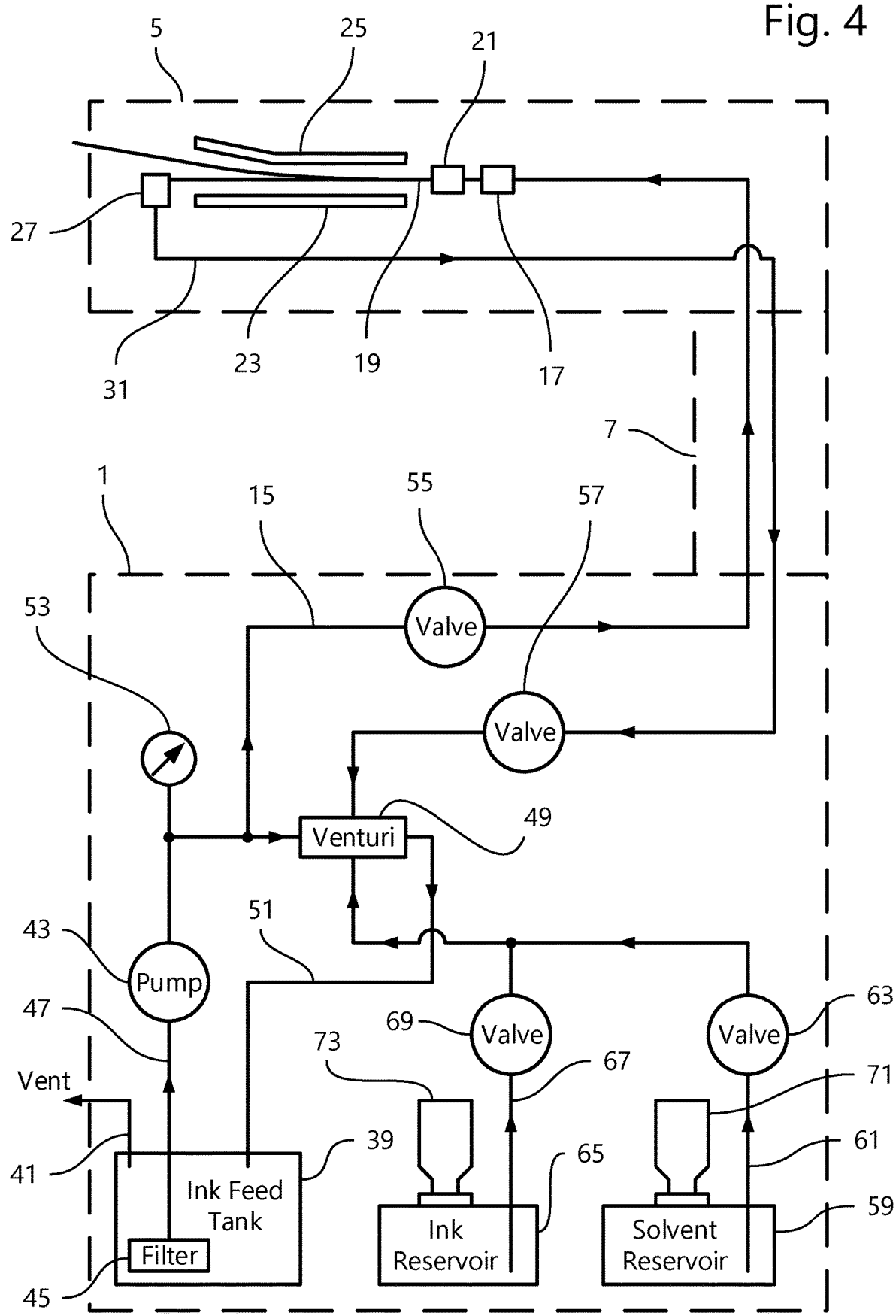
FIG. 4 shows simplified schematic diagram of the fluid system of the printer of FIG. 1.

FIG. 4 is a simplified schematic diagram of a fluid system for the ink jet printer of FIG. 1. Ink is held in an ink feed tank 39 in the printer body 1. The ink feed tank 39 is the main ink tank of the printer. The interior of the ink feed tank 39 is held at atmospheric pressure by a vent 41. Ink is sucked out of the ink feed tank 39 by a pump 43, via a filter 45 and an ink supply line 47. The ink, pressurised by the pump 43, flows through a Venturi 49 and back to the ink feed tank 39 via an ink return line 51. A pressure transducer (pressure sensor) 53 is used to sense the ink pressure on the outlet side of the ink pump 43.

The ink feed line 15 is also connected to the outlet side of the ink pump 43 and receives pressurised ink. Thus the ink feed line 15 provides an ink feed path to supply pressurised ink from the ink pump 43 to the ink gun 17. An ink feed valve 55 controls the flow of ink along the ink feed line 15. The pump 43 can drive ink continuously through the Venturi 49 and back to the ink feed tank 39, even when the ink feed valve 55 prevents ink from flowing along the ink feed line 15. The flow of ink through the Venturi 49 generates suction and accordingly the Venturi acts as a suction source. The gutter suction line 31 is connected to a suction inlet of the Venturi 49 to receive suction which sucks ink from the gutter 27 through the umbilical 7 back to the printer body 1. The ink from the gutter suction line 31 is sucked into the Venturi 49 and returns to the ink feed tank 39 via the ink return line 51. Fluid flow in the gutter suction line 31 is controlled by a gutter valve 57.

Spare solvent is held in a solvent reservoir 59 which receives suction from the Venturi 49 through a solvent top-up line 61. If solvent needs to be added to the ink in the ink feed tank 39 to dilute the ink and correct its viscosity, a solvent top-up valve 63 in the solvent top-up line 61 is opened briefly. This allows the Venturi 49 to suck a small quantity of solvent from the solvent reservoir 59 into the ink flow through the Venturi 49. The solvent sucked into the Venturi 49 then passes into the ink feed tank 39 to dilute the ink.

Spare ink is held in an ink reservoir 65 which receives suction from the Venturi 49 through an ink top-up line 67. When the level of ink in the ink feed tank 39 becomes low, an ink top-up valve 69 in the ink top-up line 67 is opened. Ink is sucked out of the ink reservoir 65 by the Venturi 49 and is delivered to the ink feed tank 39 in a similar manner to the operation for topping up with solvent from the solvent reservoir 59.

The solvent reservoir 59 and the ink reservoir 65 are supplied from a solvent container 71 and an ink container 73 respectively, and the operator replaces the containers 71, 73 as necessary. In practice, it is not always necessary to provide the solvent reservoir 59 and the ink reservoir 65, and the respective top-up lines 61, 67 may be connected directly to the containers 71, 73.

Figure 5:
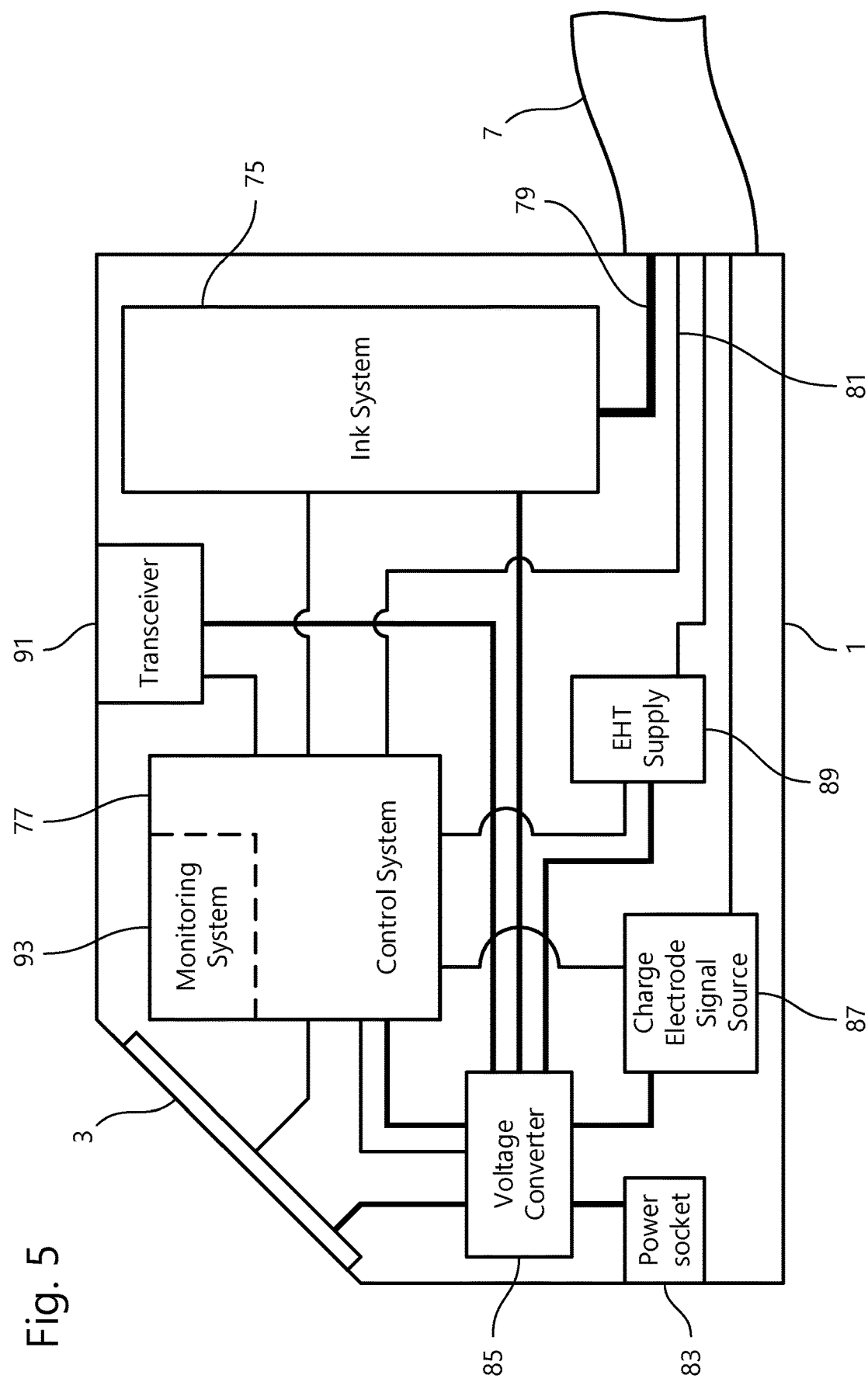
FIG. 5 shows schematically the main components inside the printer body of the printer of FIG. 1.

FIG. 5 shows schematically some of the components inside the printer body 1 of the printer. The printer has a printer body ink system 75, which includes the components in FIG. 4 that are shown inside the printer body 1. The printer body ink system 75 and other parts of the printer operate under the control of a control system 77. The control system 77, for example, sends control signals to the ink pump 43 and to the various valves, 55, 57, 63, 69 of the printer body ink system 75. The control system 77 receives outputs from the pressure sensor 53 and also from level sensors in the ink feed tank 39, the solvent reservoir 59 and the ink reservoir 65. The control system 77 also provides outputs to, and receives inputs from, the touchscreen display 3. Typically, the control system will include a processor such as a microprocessor and other electronic components as is well known in the art.

Fluid lines 79 connect the printer body ink system 75 to the print head 5 through the umbilical 7. These fluid lines will include the ink feed line 15, and the gutter suction line 29 shown in FIG. 4. Electrical lines 81 connect the control system 77 to the print head 5 via the umbilical 7. These electrical lines include for example a line for carrying a drive signal, or data for controlling the drive signal, for a piezo-electric crystal inside the ink gun 17 that applies the vibration (pressure modulation) to the ink and lines that carry signals from the phase electrode 33 and the time of flight electrode 35 to the control system 77.

The printer receives electric power at a power socket 83, which is converted in a voltage converter 85 to the various voltages required internally within the printer. For example, the printer may be designed to receive 24 volt DC at the power socket 83, since power supplies for generating 24 volts DC from an electric mains supply are widely available. The voltage converter 85 uses the received 24 volt supply to generate the voltages required to power the electronics in the control system 77, which may for example be 5 volts. It also supplies power to a charge electrode signal source 87 and an EHT supply 89. The charge electrode signal source 87 operates under control of the control system 77 to generate the voltages (e.g. up to about 300 V) to be applied to the charge electrode 21 in the print head 5. The EHT supply 89 is arranged to generate a large negative voltage for one deflection electrode 23 and a large positive voltage for the other deflection electrode 25, typically around −4 kV and +4 kV respectively. The voltage converter 85 also supplies power to the printer body ink system 75 for driving ink system components such as the valves 55, 57, 63, 69 and the ink pump 43.

The printer body 1 also contains a transceiver 91 that enables the control system 77 to transmit data out of the printer and to receive data from outside the printer. The transceiver may transmit and receive wirelessly, e.g. by a radio connection to a router for communication with the Internet or a local intranet or by communication with a cellular telephone network, and/or it may transmit over a wired connection using for example a USB connection or an Ethernet connection.

The electrical system shown in FIG. 5 is simplified and in practice there will be other components which are not shown in FIG. 5.

In a first embodiment the control system 77 includes a phase instability monitoring system 93, which may be implemented at least in part by software running on one or more processors in the control system 77. During a phasing operation the control system 77 controls both the shape of the signal output to the charge electrode 21 by the charge electrode signal source 87 and the phase of the signal relative to the modulation signal that is sent by the control system 77 to the piezoelectric device in the ink gun 17. The control system 77 receives a signal from the phase electrode 33 and therefore is able to determine which phase positions of the phasing signal output by the charge electrode signal source 87 result in charged ink drops, and the control system 77 identifies which possible phase position includes the break-up phase. The monitoring system 93 analyses this identification of which possible phase position includes the break-up phase, and in particular analyses changes in the identification of which possible phase position includes the break-up phase, to monitor phase stability or instability.

The control system 77 also receives a signal from the pressure sensor 53, representing the pressure of the ink on the output side of the ink pump 43. Optionally the monitoring system 93 uses this pressure information in order to avoid determining that the break-up phase is unstable on occasions when a change in the break-up phase is the result of a change in the ink pressure.

The control system 77 controls the operation of the ink pump 43 to keep the ink pressure (as sensed by the pressure sensor 53) at a target level. The control system 77 receives a signal from the time-of-flight electrode 35 and is able to use this in combination with the signal from the phase electrode 33 to determine the time-of-flight of the ink jet 19 from the phase electrode to the time-of-flight electrode. If the time-of-flight of the ink jet 19 varies from a desired value, representing the desired ink jet speed, the control system 77 alters the target level for the ink pressure to increase or decrease the ink pressure, and therefore the ink jet speed, as necessary to return the time-of-flight to its desired value. If the target level for the ink pressure, required to achieve the desired time-of-flight, exceeds a desired range it is concluded that the ink viscosity is too high and the control system 77 sends a signal to open the solvent top-up valve 63 briefly thereby allowing the Venturi 49 to suck a small amount of solvent into it. The solvent then travels to the ink feed tank 39 and dilutes the ink that is used to form the ink jet 19. Optionally the monitoring system 93 uses information that solvent is being added to the ink (or has recently been added to the ink) in order to avoid determining that the break-up phase is unstable on occasions when a change in the break-up phase is the result of a change in the ink viscosity as a consequence of the addition of solvent.

If the monitoring system 93 determines that the break-up phase is unstable, it outputs an alert. The alert may be a diagnosis that probably the ink gun 17 is partially blocked. This alert may be stored by the control system 77 and may cause the control system 77 to perform, at a convenient time, an action likely to clear the ink gun 17 such as forming a jet of solvent instead of ink or applying suction to the inside of the ink gun to suck air into it through the jet-forming hole which may help to dislodged any obstruction in the ink gun 17. Alternatively or in addition, an alert such as a diagnosis that the ink gun is partially blocked may be displayed on the touchscreen display 3 and/or sent to the transceiver 91 for transmission to a device or system external to the printer. The alert may be sent to a mobile device such as a smartphone to enable an operator or other personnel to be alerted even if they are not close to the printer at the time when the alert is output.

Preferably the alert comprises a recommendation for action likely to clean or unblock the ink gun 17. For example, a message may be displayed on the touchscreen display 3 stating that phase instability has been detected and/or that it is likely that the ink gun 17 is partial blocked, and recommending action such as stopping and restarting the ink jet or cleaning the external face of the ink gun 17 at which the ink jet 19 is formed.

If the operator instructs the printer to stop the ink jet and restart it, the control system 77 will typically control the printer to perform a series of actions required for a clean shut down and a clean jet start, and these actions may include briefly forming a jet of solvent at the ink gun 17 in place of the ink jet 19, and/or sucking air into the ink gun 17 through the hole used to form the ink jet 19. A jet of solvent may dissolve an obstruction formed of dried ink, which may be present at the jet-forming hole of the ink gun 17, and sucking air in through the jet-forming hole may dislodge an obstruction inside the ink gun 17. Therefore simply stopping the ink jet and restarting it may correct a partial blockage at the ink gun 17.

Cleaning the external face of the ink gun typically requires the ink jet to be stopped. The operator may then remove the print head cover that closes the space above the baseboard 37 and then clean the face of the ink gun 17 with a brush and/or wash it with solvent. After the face of the ink gun 17 has been cleaned, the operator will replace the print head cover and restart the ink jet. Therefore this action provides the effect of stopping and restarting the ink jet as well as the effect of cleaning the face of the ink gun 17.

The monitoring system 93 may store information about previous alerts that have been issued. This allows it to take account of the history of its previous actions. If the monitoring system 93 makes several successive determinations that the break-up phase is unstable and outputs several successive alerts it may include different information or recommendations in different alerts. For example, it may recommend stopping and starting the ink jet in a first alert, cleaning the ink gun 17 in a second alert and arranging a service engineer visit in a third alert. This allows the monitoring system to provide a graduated response that takes account of less disruptive action has previously been recommended.

The monitoring system may also take account of the history of actions by the operator. The control system 77 will be able to record that the inkjet has been shut down and that the ink jet has been restarted. There may not be any way to detect that the operator has cleaned the face of the ink gun 17, but there is usually a sensor to detect removal and replacement of the print head cover and so the control system 77 can record whether this has been done. The monitoring system 93 can use this information to vary the content of the alerts that are output if it determines that the break-up phase is unstable. For example, if no previous alert has been issued recently (which could be defined for example as within the past day or the past week), the monitoring system could output an alert that includes a recommendation that the jet should be stopped and restarted. If a previous alert has been issued recently, and there is a record that the ink jet has been stopped and started again since the recent previous report was issued, the monitoring system 93 could output an alert that recommends that the ink gun 17 is cleaned. If the previous alert recommended that the ink gun 17 is cleaned and there is a record that the print head cover has been removed, suggesting that the recommended cleaning was carried out, the monitoring system 93 could issue an alert recommending that a service engineer is called.

The monitoring system 93 could follow a different procedure if desired, and the procedure could be different if there are different options available for attempting to clear a partial blockage at the ink gun 17. The monitoring system 93 may also have rules for deciding the content of an alert if there is no record that the action recommended in a previous alert has been acted on.

Instead of outputting an alert that recommends that a service engineer is called, the monitoring system 93 may use the transceiver 91 to send a request for a service engineer to a system outside the printer, preferably to an external monitoring system or a service organisation, and may output an alert that includes information that a service engineer has been requested.

The monitoring system may also take account of the history of its previous actions and/or actions by the operator in other ways. For example, it may suppress the issuing of a further alert, or even cease to analyse the data about the break-up phase, for a set period after an alert has been issued and/or for a set period after action by the operator that might correct a partially blockage at the ink gun 17 is detected. The operator is likely to wait for a convenient moment before acting on an alert from the monitoring system 93. An industrial marking or filling line might normally be shut down only once per day. Therefore if the monitoring system may wait for 12 or 24 hours after an alert before outputting another alert unless it detects that the operator has taken some action that might clear a partial blockage in the meantime. The monitoring system might wait for a set period, e.g. an hour, after it detects that the operator has taken the action before it outputs another alert. This allows time for the consequences of the operator's action to become stable (e.g. a partial blockage that has been moved or broken up, but not completely removed, to be dissolved or flushed away by the ink jet) before the monitoring system determines whether the break-up phase has become stable or whether the break-up phase is still unstable.

In another embodiment, the control system 77 uses the transceiver 91 to send an external system the data used by the monitoring system 93 of the previous embodiment. Preferably the data is accompanied by an indication of the identity of the printer, since the external system may receive data from a plurality of printers. A monitoring system at the external system can perform the same actions as the monitoring system 93 in the printer, except that the monitoring system at the external system cannot provide an output directly to the touchscreen display or other output device in the printer. The monitoring system at the external system can provide an output at the external system, and an operator at the external system can take action in response. Such action may be to send a message, based on the output of the monitoring system, to the operator and/or other personnel at the organisation that is using the printer. The operator at the external system may also arrange for a service engineer to visit the printer if this is recommended by the output from the monitoring system. Alternatively or in addition, the monitoring system at the external system may send an alert or other output to a system or device outside the external system, for example it may send an alert direct to the printer or a mobile device such as a smartphone of an operator or other personnel without the need for action by an operator at the external system.

FIG. 6 shows an example of how the printer can communicate with an external system to enable a monitoring system at the external system to determine if the break-up phase of the printer is unstable. As shown in FIG. 6, the transceiver 91 may be used to transmit data to a remote monitoring system 95 if the business 97 using the printer 99 is a customer of the monitoring business that operates the monitoring system 95. As shown in FIG. 6, this transmission will typically be via the Internet 101. The indication of the identity of the printer, transmitted by the printer 99 with the data, allows the monitoring system 95 to know which printer the data relates to. The remote monitoring system 95 may also receive data from printers of other customers 103.

As shown in FIG. 6, the customer business 97 may use several printers 99. Each printer 99 may send data to the remote monitoring system 95. As shown in broken lines in FIG. 6, the printers 99 may be set up to send warnings to the customer's own control system 105 for the site where the printers 99 are in use, either instead of or as well as sending warnings to the remote monitoring system 95. Transmission from the printers 99 to the customer's control system 105 may be via dedicated cables (e.g. Ethernet) or may be via an intranet. This allows the customer to operate a central system to monitor multiple printers 99, possibly over multiple sites. The remote monitoring system 95 or the customer's control system 105 may send data to an application that runs on one or more mobile devices such as smartphones, enabling a supervisor to receive warnings in real time as they move around the customer's site.

The remote monitoring system 95 will typically be used by a service organisation to provide support and service to the customers 97, 103. It may use the data received from the printers of its customers to provide information about the state of the fleet of printers as a whole. FIG. 7 shows an example of a display that may be provided, based on the information about whether the break-up phase is unstable for each printer that sends information to the remote monitoring system 95.

In FIG. 7, an upper part of the display provides a graphical representation of the proportion of the total fleet of printers that has unstable break-up phase and probably has a partially blocked ink gun. The graphical representation is in the form of a ring, which has one colour for the proportion of the fleet that does not have unstable break-up phase and a different colour for the proportion of the fleet that does have unstable break-up phase. Other forms of graphical representation could be used if desired. Although it is not shown in FIG. 7, each graphical representation could be accompanied by a number giving the proportion or the total number of printers that has an unstable break-up phase. This allows an operator to obtain a quick overview of the level of problems across all the printers being monitored and the level of support or service action that is required. As shown in FIG. 7, historical information can also be displayed. In FIG. 7, graphical representations are provided of the proportion of the total number of printers that has had unstable break-up phase in the past week and in the past month.

A lower part of the display shown in FIG. 7 lists the individual printers 99 and gives information about them. The operator can select any of the graphical representations in the upper part of the display and in response the information shown in the lower port of the display will be based on the corresponding time period. In FIG. 7, the information about the individual printers is based on current condition of each printer because the operator has selected "Current faults" in the upper part of the display. This selection is indicated by the presence of a box around the "Current faults" region in the upper part of the display.

The list in the lower part of FIG. 7 gives information about each individual printer. FIG. 7 shows a "Customer" column for the name of the customer who uses the printer, a "Printer ID" column for a unique identification code for the printer, a "Printer Type" column for the type or model of the printer, and a "Fault duration/status" column that provides (for printers that currently have an unstable break-up phase) how long the break-up phase of the printer has been unstable and information about the current status of the fault. The status information might for example include what remedial action has been recommended (e.g. operator to stop and restart the jet, operator to clean the ink gun, or service engineer to be sent) and whether it has been carried out. For printers that do not currently have an unstable break-up phase, this column could list when the printer last had an unstable break-up phase and what action successfully resolved it. Additional or different columns of information could be provided if desired. The columns of information displayed may be different when different ones of the graphical representations are selected.

The list in the lower part of FIG. 7 can be sorted according to any column by selecting the relevant column heading. In FIG. 7 the list is sorted by "Fault duration/status". This selection is indicated by displaying the column heading in bold. When the list of printers is sorted by this column, the printers with the status "service engineer visit recommended—engineer visit not yet booked" can be placed at the top of the list. This enables the operator, who may be responsible for booking engineer visits, to see their outstanding work and the current demand for engineer visits. Further down the list, the operator may see printers that currently have unstable break-up phase and a recommendation has been made for remedial action that can be carried out by the operator (such as stopping and restarting the ink jet or cleaning the face of the ink gun). This enables the operator to monitor the extent to which action by the operator is effective to correct unstable break-up phase.

When the phase stability monitoring system determines that the break-up phase is unstable, it outputs an alert in the form of changing the entry for the printer in the "Fault duration/status" column to show that there is a fault. If the operator is monitoring this column, this change in the printer's entry should be effective to inform the operator that the printer concerned has an unstable break-up phase. Accordingly, this may be the only form of alert that the monitoring system outputs, and it may be up to the operator at the monitoring system to alert other people such as the operator of the printer 99. However, it is preferred that the monitoring system outputs its alert in other ways as well, such as by a message or other change on the display at the system 93 in case the operator is not actively monitoring the "Fault duration/status" column. As previously mentioned, the monitoring system can also send an alert message to the operator of the printer 99 or other personnel.

If the phase stability monitoring system is provided in the customer's control system 105, a similar display to the on shown in FIG. 7 may be provided. However, the column "Customer" in the lower part of the display is unnecessary. If the customer's control system 105 receives data from printers at multiple sites, the "Customer" column could be replaced by a "Site" column.

Figure 8:
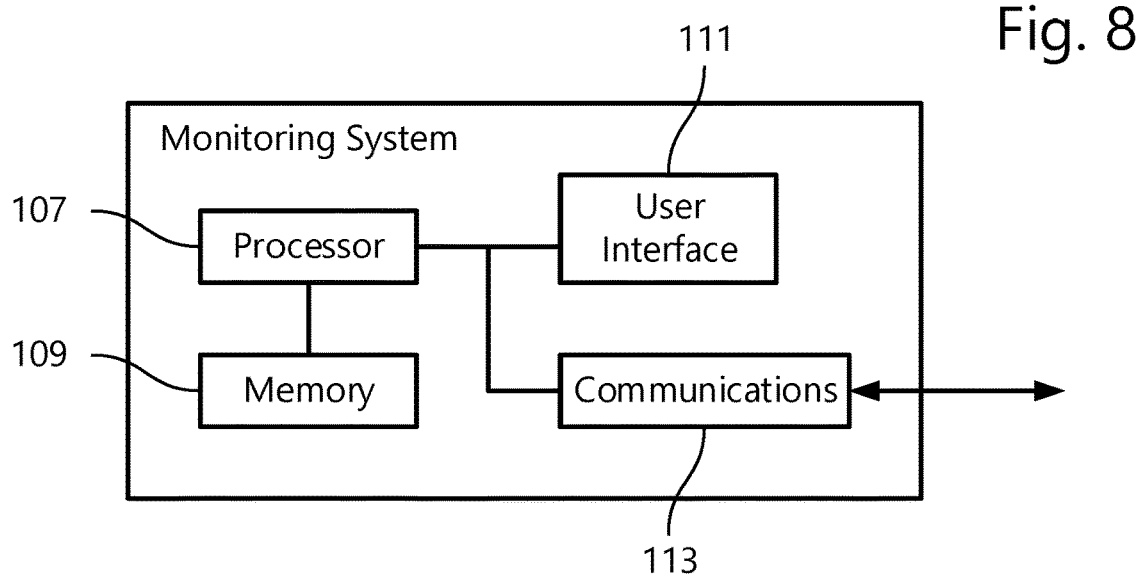
FIG. 8 is a diagram of the main components of a monitoring system.

FIG. 8 shows the main hardware components of the phase stability monitoring system. If the phase stability monitoring system is part of a larger system, such as the case of the monitoring system 93 in FIG. 5 which is part of the larger control system 77, the phase stability monitoring system may share some or all of its hardware with other parts of the larger system. The monitoring system comprises a processor 107, which performs the processing actions of the monitoring system such as analysing the phase data, a memory 109 that stores data, a user interface 111 for receiving inputs from and providing outputs to an operator, and a communications apparatus 113 for receiving data such as the phase data and transmitting data such as the alerts. The method of monitoring the break-up phase will be implemented by a program that is run by the processor 107. The program may be stored in a program memory device that is part of the overall memory system 109 of the monitoring system.

Figure 9:
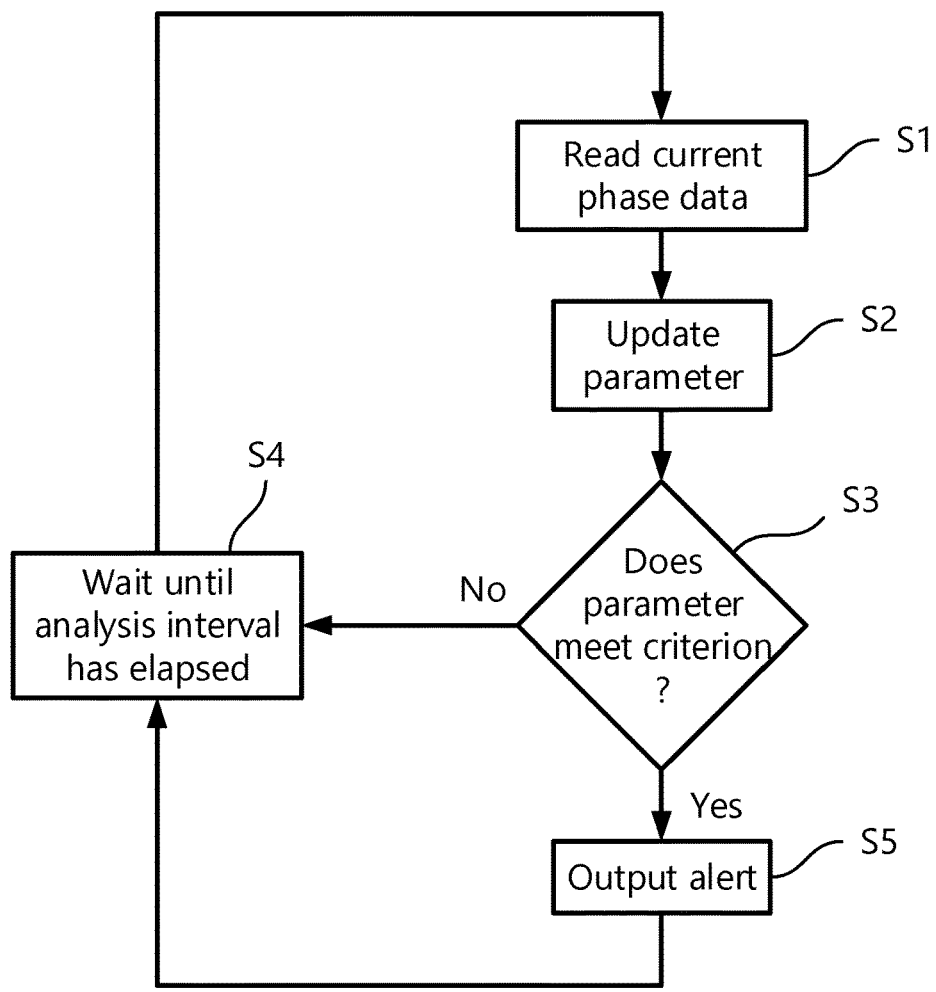
FIG. 9 is a flow diagram of a process for monitoring phase data of a printer and outputting an alert if it is determined that the break-up phase is unstable.

FIG. 9 is a flow diagram of an example of a general process for monitoring phase data of a printer and outputting an alert if it is determined that the break-up phase is unstable.

Many of the examples given above of ways in which the break-up phase can be analysed to determine whether the break-up phase is unstable can be regarded as defining an analysis parameter that is derived from the phase data and comparing the analysis parameter with a criterion to determine whether the break-up phase is unstable. Accordingly, in step S1 the process of FIG. 9 reads the current phase data and in step S2 it updates the analysis parameter to take account of the phase data read in step S1. In step S3 the analysis parameter is compared with the criterion used to define phase instability. If the parameter does not meet the criterion, the process moves to step S4. In this example, there is a set analysis interval between each occasion when the phase data is read and the analysis parameter is updated. In step S4 the process waits until the analysis interval has elapsed before returning to step S1. If the parameter meets the criterion in step S3, this corresponds to a determination that the break-up phase is unstable and accordingly the process moves to step S5 in which an alert is output.

Figure 10:
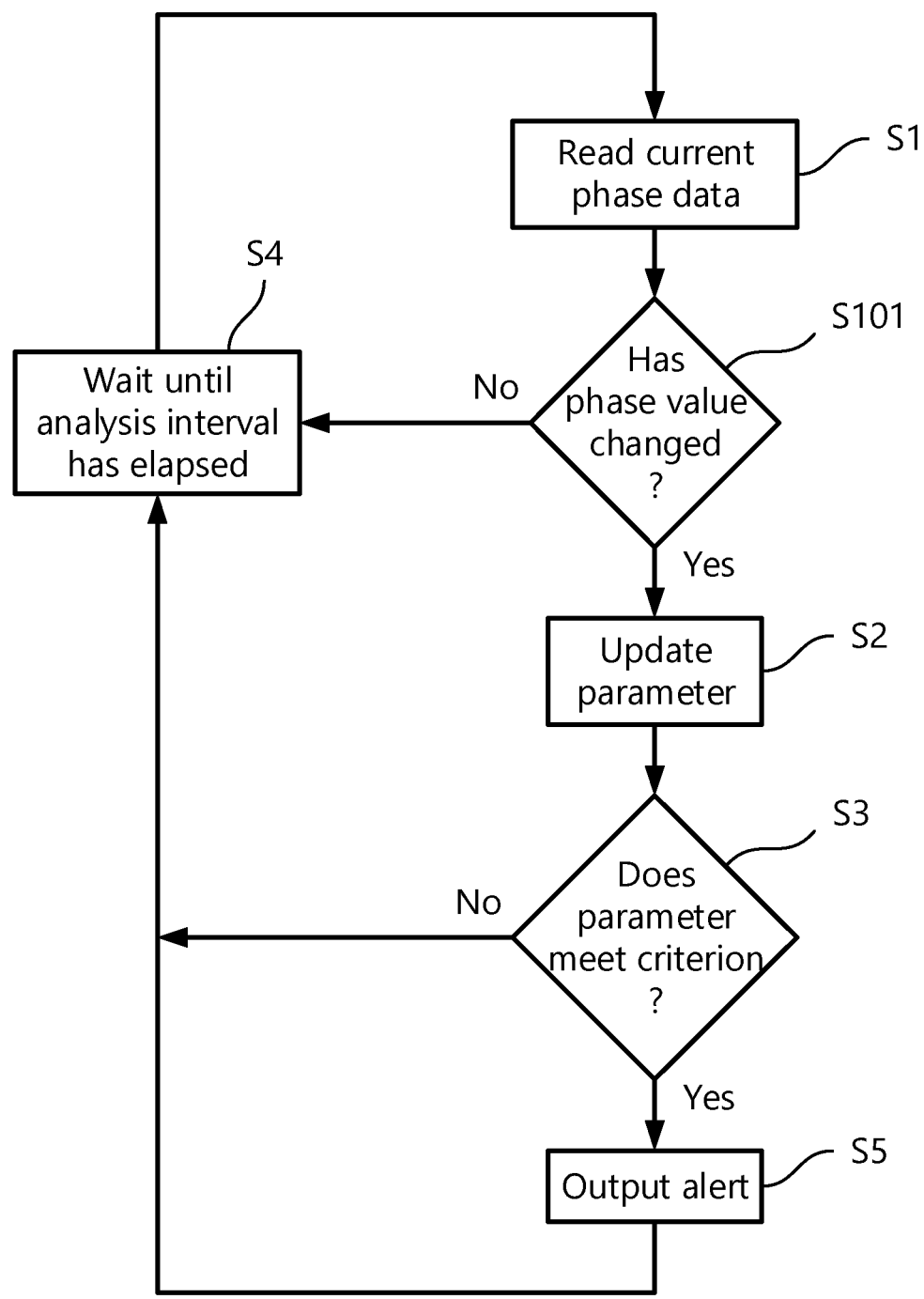
FIG. 10 shows a modification of the flow diagram of FIG. 9, used in an embodiment of the invention.

FIG. 10 is a flow diagram showing a modification of the general process of FIG. 9, used in an embodiment of the invention. In this embodiment, the analysis parameter is the average size of changes of phase, i.e. the sum of the absolute value of each change divided by the number of changes. This can be represented by the equation Pa=Σ|Δ|/n where Pa is the analysis parameter, |Δ| is the absolute size of a change in phase (e.g. the number of phase positions by which the break-up phase has changed in a single change or the angle of phase of the change), and n is the number of changes.

In FIG. 10, steps S1 to S5 are the same as in FIG. 9, but after the current phase data is read in step S1 of FIG. 10 the process moves to step S101 to check whether the phase position has changed since the previous time the phase data was read. If the phase position has not changed, there is no need to update the analysis parameter Pa and so the process moves immediately to step S4 to wait until the analysis interval has elapsed. If the phase position has changed, the process moves to step S2 in which the calculated average used as the analysis parameter Pa is updated. In step S3 the analysis parameter (the calculated average) is compared with a criterion, which in this case is a requirement that the calculated average exceeds a threshold value that is above 1 (preferably at least 1.3—corresponding to about 30° of phase if the 360° phase cycle is divided into 16 possible phase positions) and preferably below 2. If the calculated average does not exceed the threshold value, the process moves to step S4 to wait until the analysis interval has elapsed. If the calculated average does exceed the threshold value, the process determines that the break-up phase is unstable and it moves to step S5 in which an alert is output.

In operation of the printer, the break-up phase may be measured at intervals of a second or less. However, in the analysis of FIG. 10 the analysis interval is preferably in the range of 1 second to 10 seconds, and is more preferably at least 2 seconds. As noted above, a partial blockage at the ink gun 17 may result in changes in phase of up to 360° within 10 to 15 seconds. Assuming that 360° of phase corresponds to 16 possible phase positions, if the analysis interval is at least 1 second and preferably at least 2 seconds, it is likely that a partial blockage at the ink gun 17 will result is at least some changes in phase of at least two phase positions per analysis interval. This likelihood is increased if the analysis interval is at least 4 seconds. The analysis interval is preferably no longer than 10 seconds in order to make it likely that a disruption of the break-up phase lasting between 10 to 15 seconds will be split between at least two analysis intervals so that successive values of the break-up phase read at the analysis interval will be likely to be different owing to the disruption in phase. Accordingly, a partial blockage at the ink gun 17 will almost certainly result in the calculated average rising above 1 provided that a suitable analysis interval is chosen.

Although this process uses a simple analysis, it is reasonably reliable at detecting when the break-up phase has become unstable due to a partial blockage at the ink gun 17 without incorrectly identifying small phase changes during normal printer operation as phase instability.

As noted above, the break-up phase may alternate between adjacent phase positions when the break-up phase is stable. This will result in changes in phase of one phase position at a time. Other changes in break-up phase that arise during normal operation with a stable break-up phase also tend to result in changes in phase of one position at a time. Therefore these changes in phase position do not lead to the calculated average exceeding the threshold value, which is greater than one.

Therefore the value of the calculated average represents the balance between small changes in break-up phase that are typical of a stable break-up phase and tend to lead to an average size of changes of phase of 1 phase position or very slightly more, and large changes in break-up phase that are typical of an unstable break-up phase and tend to lead to an average size of change of phase of 2 phase positions (or even more if the phase changes by 3 phase positions or more in a single change). Therefore the threshold value should be at least 1.3 (corresponding to about 30° of phase if the 360° phase cycle is divided into 16 possible phase positions) and more preferably at least 1.5 (corresponding to about 34° of phase if the 360° phase cycle is divided into 16 possible phase positions). If the average size of changes of phase is more than 1.5, this means that at least half of all changes of phase are changes by 2 phase positions, or there are some changes of phase by more than 3 positions or more. The threshold value might for example be in the range of 1.6 (corresponding to 36° of phase if the 360° phase cycle is divided into 16 possible phase positions) to 1.8 (corresponding to about 41° of phase if the 360° phase cycle is divided into 16 possible phase positions).

The average size of changes of phase may be a moving average. Preferably the average is taken over a long period or a large number of phase changes. If the size of changes of phase is averaged over time, the time period should be at least half an hour, preferably at least an hour, and may be longer such as 6, 12 or even 24 hours. If the size of changes of phase is averaged over a number of changes, the number of changes should be at least 20, and may be a larger number such as 100 or even 500. If the average is taken over a long period or a large number of changes, and the break-up phase is stable with almost all changes in phase being changes by one phase position, a single brief period of large phase changes will not change the value of the average by much and so the process of FIG. 10 will not determine that the break-up phase is unstable under these circumstances. This is advantageous because a single brief period of larger phase changes, which is not repeated, is unlikely to be caused by a partial blockage at the ink gun 17 and whatever the cause of the larger phase changes it is unlikely that any remedial action is required if the brief period of larger phase changes is not repeated. However, if there is a partial blockage at the ink gun 17, periods of large changes of phase are likely to last for longer or be repeated (for example, periods of large changes of phase could last for 10 seconds and be repeated about once per minute) and so the number of large changes of phase will increase rapidly, increasing the average size of the changes in phase to well above 1. In this way, by taking the average over a suitable period or number of changes the process of FIG. 10 can be made to be reasonably immune to the effects of brief unrepeated periods of large change in phase while still detecting a partial blockage at the ink gun 17 reliably.

Figure 11:
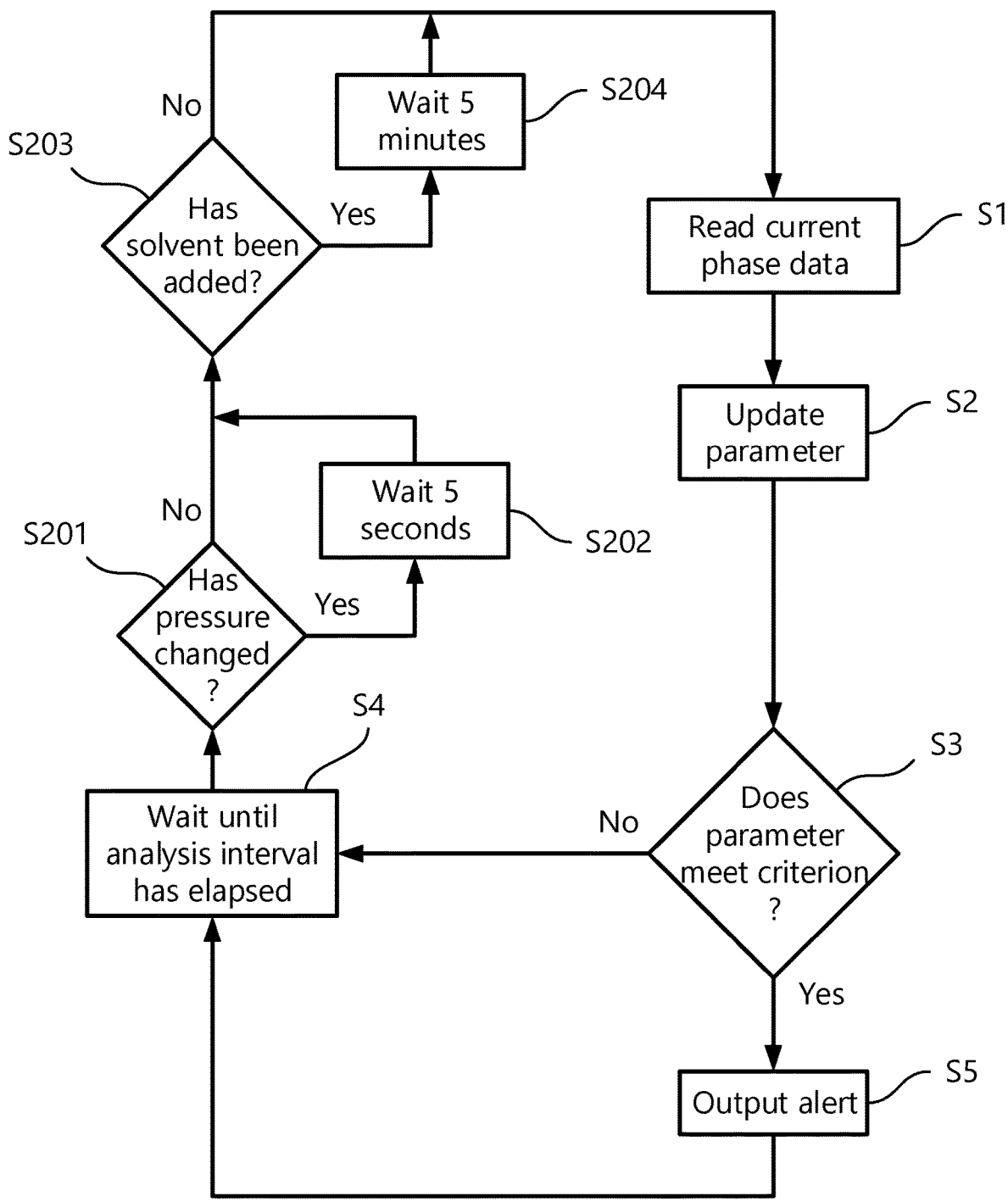
FIG. 11 shows a modification of the flow diagram of FIG. 9 in order to avoid responding to phase changes caused by events at other parts of the printer.

As noted above, some operations of the printer such as adding solvent to dilute the ink and changes in some other printer operating parameters such as ink pressure can cause changes in break-up phase. Preferably the system for detecting phase instability should not respond to these, since they either result from normal printer operation or they are the result of a problem with the other operating parameter and the changes in phase do not represent the underlying problem. FIG. 11 shows how the flow diagram of FIG. 9 can be modified to prevent the system from determining that the break-up phase is unstable in these cases.

In FIG. 11 steps S1 to S5 are the same as in FIG. 9. After the process has waited for the analysis interval to elapse in step S4, the process of FIG. 11 does not return to step S1 immediately. Instead it carries out one or more to checks to see if there has been a printer operation or a change to another printer parameter that might cause a change in the break-up phase that should be ignored. In FIG. 11, the process checks one other printer parameter (ink pressure) and one printer operation (addition of solvent).

After step S4 a check is made in step S201 to see whether the ink pressure has just changed. If the pressure has just changed, the process moves to step S202 in which it waits for 5 seconds. This allows time for any transient effect of the pressure change to be completed. The process then moves to step S203. If the ink pressure has not just changed, the process moves from step S201 direct to step S203. In step S203 a check is made to see whether solvent has just been added to the ink. If solvent has just been added, the process moves to step S204 in which it waits for 5 minutes. This allows time for any transient effect of the addition of solvent to be completed. The process then moves to step S1. If solvent has not just been added, the process moves from step S203 direct to step S1.

The checks performed in FIG. 11 are examples, and other checks could be performed as well or instead of those shown. The periods of waiting in steps S202 and S204 depend on how long any disruption to the break-up phase is likely to last, which will vary depending on the cause of the disruption. If the ink pressure changes, its effect on the break-up phase is likely to be immediate, and the changes to break-up phase should cease as soon as the ink pressure stabilises again. Therefore the waiting period in step S202 is short. The waiting period in step S204 is longer to allow time for the added solvent to be mixed thoroughly with the ink in the ink feed tank 39 so that the ink viscosity becomes stable.

The periods of waiting in steps S202 and S204 are examples and different periods could be used.

In practice, the ink pressure may change frequently by small amounts in order to keep the time-of-flight constant as the ink viscosity gradually changes due to evaporation of solvent. These changes in pressure do not tend to result in significant changes in break-up phase and therefore the process used in step S201 preferably does not lead to a decision that the pressure has just changed in response to such changes. This can be achieved by responding to pressure changes at step S201 only if the changes are greater than a threshold amount or only if the pressure has changed at more than a background rate of change representing the effect of solvent evaporation. The background rate will vary from printer to printer, largely depending on the temperature of the environment in which the printer is operating. However, a long term average of the pressure changes could be used as the background rate. For example, the average rate of change between solvent to-up operations could be used as the background rate.

In one implementation of step S201, the succession of ink pressure values read from the pressure sensor 53 is passed through a digital high pass filter which is set to filter out the slow background average rate of change of pressure, and the filter output is used to determine whether there has been a change in pressure at step S201.

The analysis of the phase data may be modified to remove or compensate for the effects of pressure changes in other ways, instead of using steps S201 and S202 of FIG. 11. For example, instead of suspending operation of the analysis process if there is a large or fast change in pressure, the information about pressure changes could be provided as an additional input to step S2, which disregards phase changes that occur at the same time as, or just after, a pressure change and does not use such phase changes to update the analysis parameter.

In a further alternative, the monitoring system may use the pressure data (preferably high-pass filtered as described above) to predict the effect that the pressure will have on the break-up phase, and compensate the phase data for the predicted effect of the changes in ink pressure so that step S2 updates the analysis parameter on the basis of the compensated phase data. For example, the pressure information, or its predicted effect on the break-up phase, may be used as an additional input in step S1, and the phase data supplied to step S2 may be compensated by modifying the phase data read in step S1 in accordance with the predicted effect of the pressure information. The predicted effect of pressure changes can be determined, by experiment if necessary, for a particular model of printer possibly taking account of operating settings and other factors such as temperature, and this information can be stored and made available to the monitoring system 93. Alternatively the pressure information, or its predicted effect on the break-up phase, may be used as an additional input in step S2, enabling step S2 to use this information in the process to update the analysis parameter. For example, the analysis parameter may be updated on the basis of the difference between the phase data read in step S1 and a prediction of the phase data made in accordance with the pressure data, instead of using the phase data read in step S1 on its own.

In practice the break-up phase and the ink pressure may be sensed more frequently than once per analysis interval, and so a better result can be obtained by also compensating the phase information more frequently rather than once per analysis interval. Therefore the compensation of the phase information will take place during the waiting period of step S4 rather than as part of step S1 or S2. For example, the pressure values may be high-pass filtered as discussed above and the effect of the filtered pressure values on the break-up phase may be predicted. This predicted break-up phase behaviour may be compared with the actual detected break-up phase behaviour (possibly also high-pass filtered), and the phase data used in step S1 may be based on the results of this comparison, for example the phase data may represent the difference between the predicted break-up phase behaviour and the actual detected break-up phase behaviour. The comparison between the predicted break-up phase behaviour and the actual detected break-up phase behaviour may be carried out with a slight time shift to take account of any differences in delays in the processes for obtaining the relevant data and because the changes in break-up phase caused by changes in pressure will usually take place a few milliseconds after the pressure changes at the pressure sensor 53 in the printer body (mostly due to the time taken for the pressure changes to propagate over the length of the umbilical 7).

Figure 12:
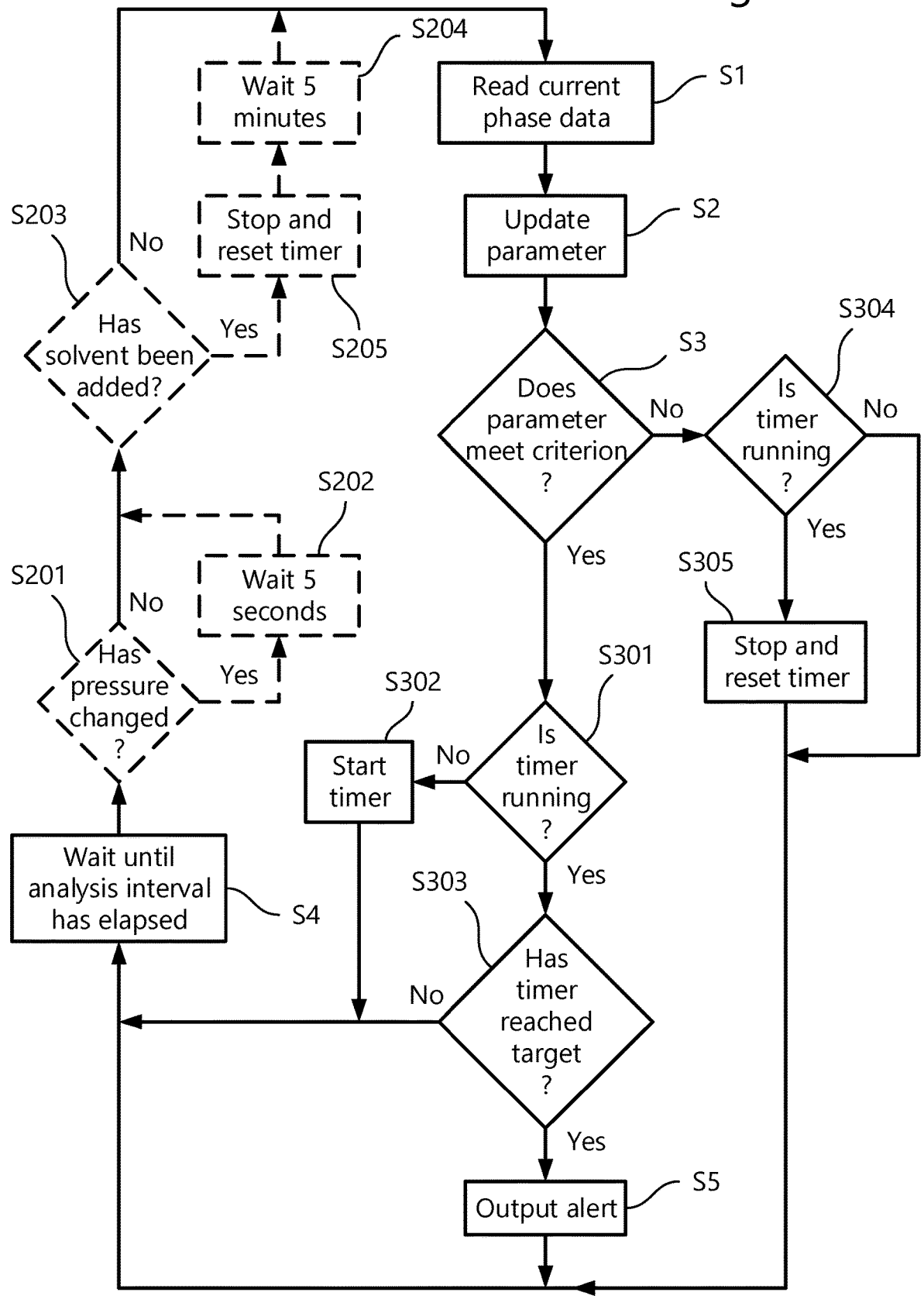
FIG. 12 shows a modification of the flow diagram of FIG. 9 so that the break-up phase is determined to be unstable only if the phase is disrupted for a set period of time.

The process for determining that the break-up phase is unstable may analyse the phase data to identify that stable break-up phase has been disrupted in some manner, but it is not desired to determine that the break-up phase is unstable if the disruption only lasts briefly. FIG. 12 shows how the process of FIG. 9 may be modified to provide this result. For example, the break-up phase may be regarded as disrupted if the number of different phase position occupied in a period of two minutes exceeds three, but the break-up phase is only regarded as unstable if this situation lasts for more than ten minutes. In FIG. 12, steps S1 to S5 are the same as in FIG. 9. In step S2, the parameter in this example would be the number of different phase positions occupied in the last two minutes, and in step S3 the criterion would be that the number of different phase positions should exceed three. However, in FIG. 12 the process does not move directly to step S4 or step S5 after step S3.

If the parameter meets the criterion in step S3 in FIG. 12, the break-up phase is disrupted and so the process needs to check whether this disruption lasts for sufficiently long (ten minutes in the example given above) for it to be determined that the break-up phase is unstable. The process uses a timer to determine whether the disruption lasts for sufficiently long. Therefore the process moves to step S301 in which it checks whether the timer is already running. If the timer is not already running, the process moves to step S302 to start the timer, and then moves to step S4 to wait until the analysis interval has elapsed. If the timer is already running at step S301, the process moves to step S303 to check whether the timer has reached its target value (ten minutes in the example given above) yet. If the timer has reached its target value, it is determined that the break-up phase has been disrupted for long enough for it to be regarded as unstable, and the process moves to step S5 to output an alert. If the timer has not yet reached its target value in step S303, the process moves directly to step S4 to wait until the analysis interval has elapsed.

If the parameter does not meet the criterion in step S3 in FIG. 12, the break-up phase is not disrupted. The process moves to step S304 in which it checks to see if the timer is running. If the timer is running, the process moves to step S305 to stop and reset the timer, because the break-up phase is not now disrupted and so the period of phase disruption did not last for long enough for the break-up phase to be regarded as unstable. The process then moves to step S4 to wait until the analysis interval has elapsed. If the timer is not running at step S304, the process moves directly to step S4.

The checks discussed with reference to FIG. 11 can also be carried out in the process of FIG. 12 if desired, as shown by the presence of steps S201 to S204 in broken lines in FIG. 12. However, if step S203 is carried out, and solvent has just been added to the ink so that the process waits for 5 minutes in Step S204, this waiting period is sufficiently long that it is not possible to determine whether the break-up phase is disrupted during this period. Therefore in this case, the timer is stopped and reset in step S205 and the timing of any period of disruption has to start again after the waiting period of step S204 is completed. The checks may also be carried out in other ways as discussed above, such as the alternative ways of using ink pressure data discussed above.

Figure 13:
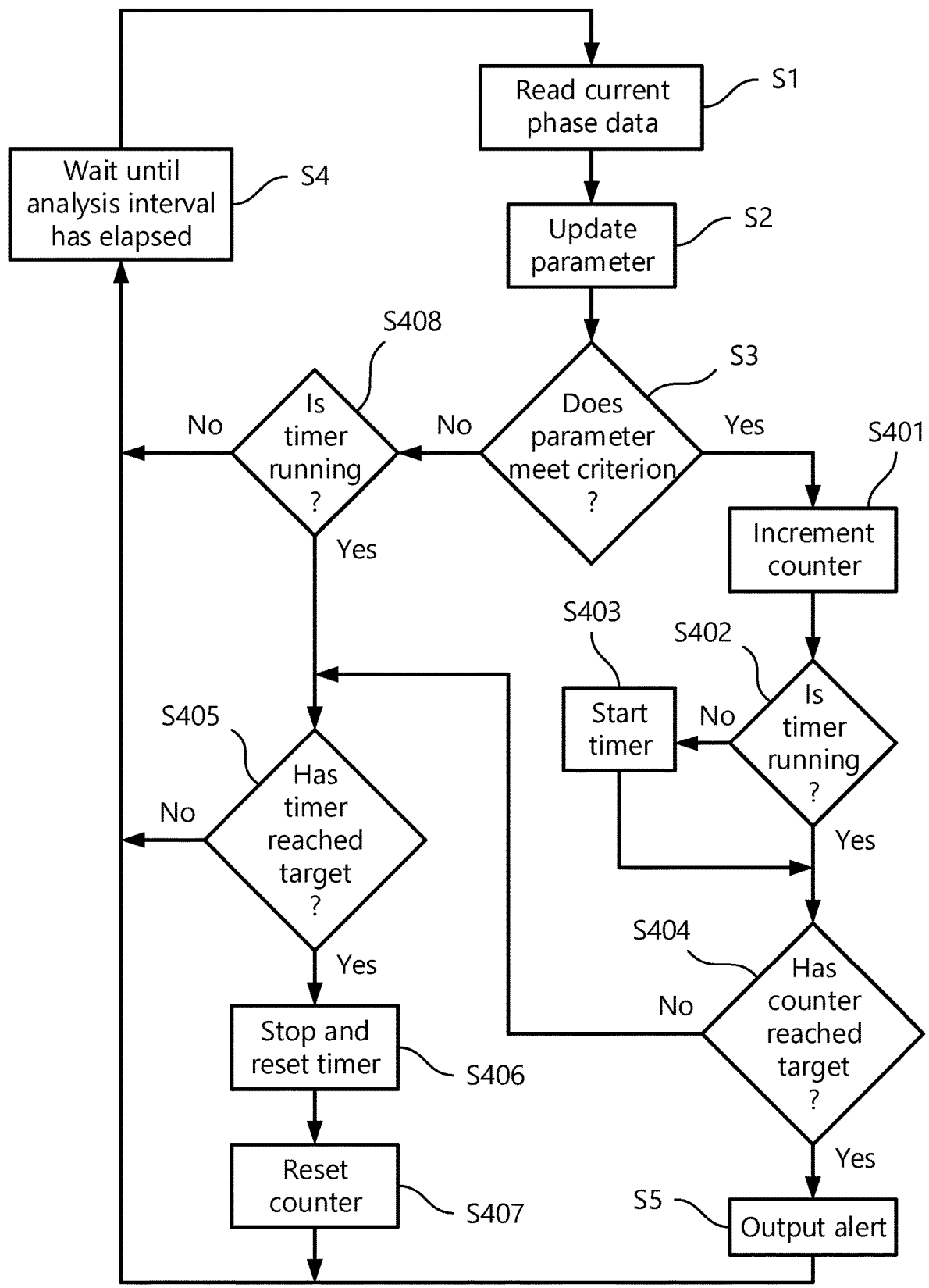
FIG. 13 shows a modification of the flow diagram of FIG. 9 so that the break-up phase is determined to be unstable only if a set number of phase disruption events occur within a set period of time.

The process for determining that the break-up phase is unstable may analyse the phase data to identify disruption events in which the break-up phase has been disrupted in some manner, but it is desired to determine that the break-up phase is unstable only if there are at least a set number of disruption events within a set period of time and it should not be determined that the break-up phase is unstable in response to a single isolated disruption event. FIG. 13 shows how the process of FIG. 9 may be modified to provide this result.

In FIG. 13, steps S1 to S5 are the same as in FIG. 9. In step S2, the parameter that defines a disruption event is updated and in step S3 the parameter is checked against the criterion that determines if a disruption event has occurred. In FIG. 13 the process does not move directly to step S4 or step S5 after step S3. Instead, if it is determined in step S3 that a disruption event has occurred, the process moves to step S401. A counter is used to count the number of disruption events, and a timer is used to measure the set period of time during which the number of disruption events is being counted. In step S401 the counter is incremented because a disruption event has been detected in step S3. Then in step S402 the process checks whether the timer is running. If the timer is not running, it is started in step S403. Then the process moves to step S404. If the timer is already running at step S402, the process moves directly to step S404. In step S404 the process checks whether the counter has reached its target (i.e. the set number of disruption events). If the counter has reached its target, the process moves to step S5 to output an alert and then the process moves to step S4 to wait until the analysis period has elapsed.

If the counter has not yet reached its target in step S404 the process moves to step S405 in which it checks whether the timer has reached its target (i.e. the set period of time, during which the number of disruption events is being counted, has expired). If the timer has reached its target this means that the set period of time has expired with less than the set number of disruption events having been counted. Therefore it is not determined that the break-up phase is unstable. In this case, the timer is stopped and reset in step S406 and the counter is reset in step S407. The process then moves to step S4 to wait until the analysis period has elapsed. If the timer has not reached its target at step S405, the process moves directly to step S4.

If the parameter does not meet the criterion in step S3, this means that a disruption event has not been detected. In this case the process moves to step S408 in which it checks whether the timer is running. If the timer is running the process moves to step S405 to check whether the timer has reached its target. If the timer is not running, the process moves to step S4 to wait until the analysis period has elapsed.

Although it is not shown in FIG. 13, the checks discussed with reference to FIG. 11 can also be carried out in this process if desired in the same way as in FIG. 12. However, if step S205 of FIG. 12 is carried out, it should be modified so as to reset the counter as well as stopping and resetting the timer. The checks may also be carried out in other ways as discussed above, such as the alternative ways of using ink pressure data discussed above.

Figure 14:
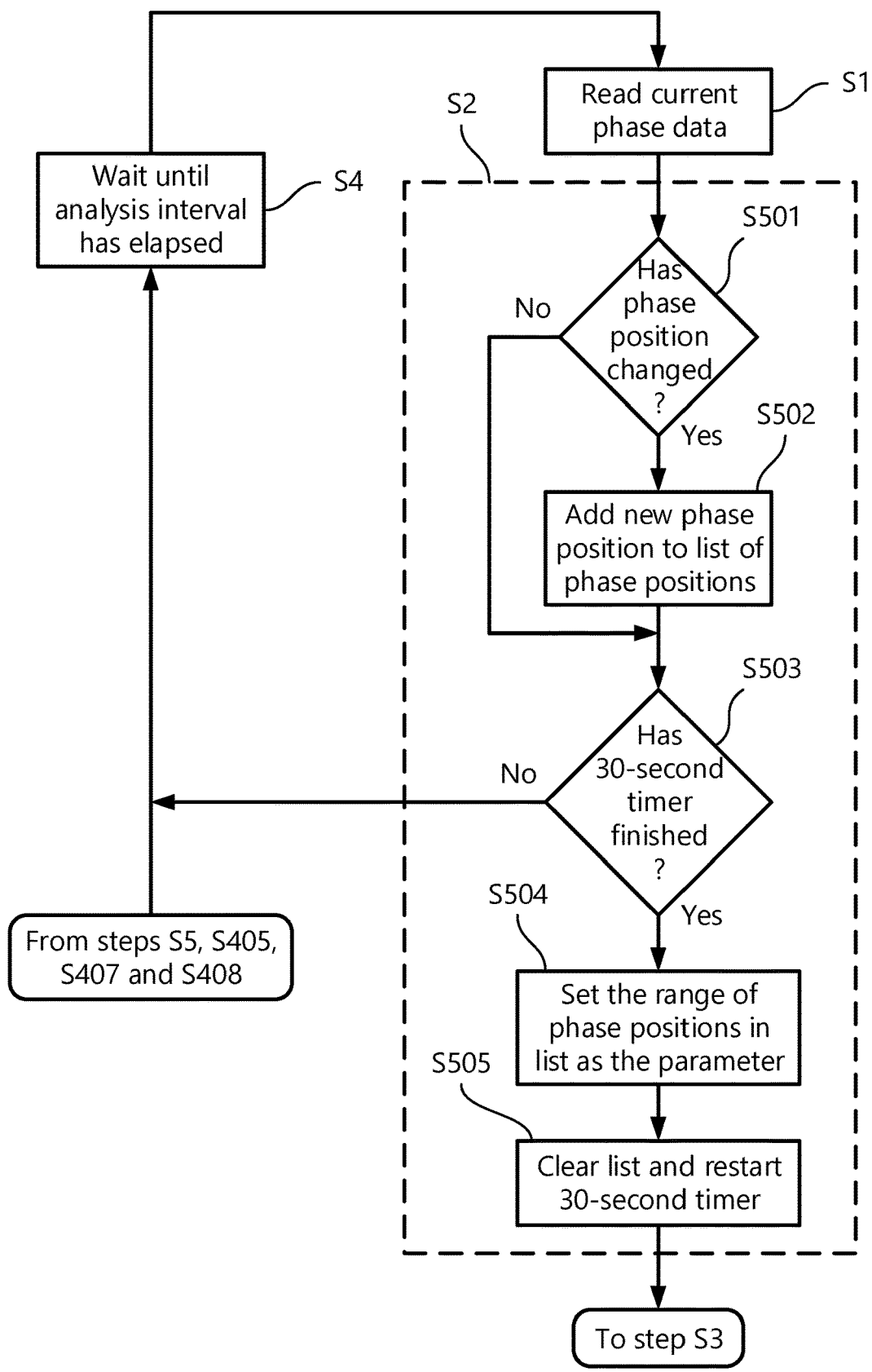
FIG. 14 shows the process for updating an analysis parameter in step S2 of FIG. 13, in an embodiment of the invention.

A partial blockage at the ink gun 17 may cause the break-up phase to change by about 360° in phase within ten to fifteen seconds, and this behaviour may be repeated at intervals of thirty seconds to a minute. Even a slight partial blockage at the ink gun 17 may cause the break-up phase to change repeatedly, and if this phase change reaches 3 possible phase positions (assuming that 360° of phase is divided into 16 possible phase positions), which corresponds to 67.5° of phase, the print quality may be affected. Therefore it is may be useful to detect phase instability caused by slight partial blockages in order to avoid this effect on print quality. Therefore an embodiment of the invention determines that the break-up phase is disrupted if the range of phase positions over a period of 30 seconds is 67.5° in phase or more (3 possible phase positions or more if the full phase cycle is divided into 16 possible phase positions), and the break-up phase is unstable if the break-up phase is disrupted in at least five 30-second periods within 30 minutes. The process for monitoring phase data of a printer and outputting an alert if it is determined that the break-up phase is unstable in this embodiment can use the process of FIG. 13. In this case, the counter of steps S401 and S404 has a target of 5 and the timer of steps S403 and S405 has a target of 30 minutes. In step S2, the analysis parameter is the range of phase positions over a period of 30 seconds and the criterion in step S3 is that the range is 67.5° in phase or more. FIG. 14 is a flow diagram showing the process inside step S2 in this embodiment. The lengths of time and the number of periods of disruption in this embodiment are examples, and other values could be chosen.

In FIG. 14, a 30-second timer is used to define 30-second analysis periods. If the analysis interval of step S4 is 5 seconds, the 30-second timer could be implemented by counting the number of times the process of step S2 has been performed, because six 5-second analysis interval will take 30 seconds. After the current phase data has been read in step S1, the procedure of step S2 begins by determining in step S501 whether the phase position has changed since the last time step S2 was performed. If the phase position has changed, the new phase position is added to a list of phase positions in step S502. Then the procedure moves to step S503 to check the 30-second timer. If the phase position has not changed at step S501, the procedure moves direct to step S503.

In step S503, the procedure checks whether the 30-second timer has finished yet. If it has not finished, the procedure moves directly to step S4 to wait for the analysis interval to elapse and the next phase data to be read in step S1. The procedure of step S2 in this embodiment is only completed, and the process moved to step S3, once every thirty seconds. If the 30-second timer has completed as step S503, the procedure of step S2 moves to step S504 which determines the range of phase positions in the list and sets this range as the analysis parameter to be provided to step S3. Then in step S505 the list is cleared and the 30-second timer is restarted to begin another 30-second analysis period. This completes step S2, and the process moves to step S3 in FIG. 13.

Under most operating circumstances of the printer, the analysis process of FIGS. 13 and 14 should reliably determine that the break-up phase is unstable in response to disruptions caused by a partial blockage at the ink gun 17 while not responding to most changes in phase that are not caused by a partial blockage at the ink gun 17.

As an alternative, the criterion in step S3 could be that the range is 45° in phase or more instead of 67.5° in phase or more (corresponding to 2 or more possible phase positions rather than 3 or more possible phase positions assuming that 360° of phase is divided into 16 possible phase positions) in order to detect slight blockages before they affect print quality. However, this may increase the risk of determining incorrectly that there is a partial blockage at the ink gun 17 causing phase instability when this is not the case.

If it is only desired to detect more serious partial blockages, for example to minimise the chance of determining that the break-up phase is unstable when there is in fact not a partial blockage at the ink gun 17, the criterion in step S3 could require a larger minimum range of phase positions (e.g. 90° or even higher) instead of 67.5° at the risk that some reduction of print quality due to less serious blockages may become more common.

The embodiments discussed above are given by way of example and should not be regarded as limiting the scope of the claims.

The invention claimed is:

1. A monitoring system comprising:
a processor and a memory, the processor configured to:
receive printer data of an electrostatic deflection continuous ink jet printer and obtain phase data from said printer data, said phase data being data (a) indicating which of a set of possible phase positions includes the break-up phase of an ink jet of the printer at each of a succession of analysis times and/or (b) indicating the change of the break-up phase of the ink jet from one of the possible phase positions to another; and
analyse the phase data, using at least one of: (a) the size, in number of possible phase positions or in angle of phase, of changes in break-up phase from one analysis time to the next; (b) the range of variation of the break-up phase within a set period of time; or (c) whether successive changes in phase are in the same direction as each other, to determine whether the break-up phase is unstable and output an alert if it determines that the break-up phase is unstable.

2. A monitoring system according to claim 1, wherein the processor is configured not to output an alert in response to alternations of the break-up phase between adjacent phase positions.

3. A monitoring system according to claim 1, wherein the processor is configured to obtain other data from the printer data, said other data being data relating to an operation other than forming the ink jet at a jet-forming device of the printer and/or data relating to a detected state, or a change in a detected state, in the printer other than the break-up phase, and which is arranged, under predetermined circumstances that are indicated to be present by the other data, not to output a said alert or to compensate the phase data or the manner of analysing the phase data for the predicted effect of the predetermined circumstances on the break-up phase.

4. A monitoring system according to claim 3, wherein the predetermined circumstances comprise the performance of an operation to dilute the ink in the printer.

5. A monitoring system according to claim 3, wherein the said other data comprise data relating to the pressure of pressurised ink in the printer, and the predetermined circumstances comprise at least some circumstances in which there is a change in the pressure of pressurised ink.

6. A monitoring system according to claim 5, wherein the predetermined circumstances comprise a change in ink pressure of more than a preset amount and/or a change in ink pressure at a rate greater than a preset amount.

7. A monitoring system according to claim 5, wherein for phase data indicating the position or change of the break-up phase during and/or for a preset period following the change in ink pressure, the phase data is not analysed or a said alert is not output in response to analysis of the phase data.

8. A monitoring system according to claim 5, wherein for phase data indicating the position or change of the break-up phase during and/or for a preset period following the change in ink pressure, (a) the phase data is compensated for the predicted effect of the change in ink pressure on the break-up phase and the analysis of the phase data comprises analysis of the compensated phase data or (b) the analysis of the phase data comprises analysis of the difference between the phase data and a prediction of the phase data made in accordance with the change in ink pressure.

9. A monitoring system according to claim 1, wherein the processor is configured not to output an alert in response to a period of phase changes that contain a total variation of phase of no more than 45° of phase and that last for no longer than 15 seconds and that are not repeated within one hour.

10. A monitoring system according to claim 1, wherein the processor is configured to output an alert if an average size, in number of possible phase positions or in angle of phase, of changes in break-up phase from one analysis time to the next exceeds a predetermined threshold value.

11. A monitoring system according to claim 10, wherein the threshold value is at least 1.3 possible phase positions or at least 30° of phase.

12. A monitoring system according to claim 1, wherein the processor is configured to output an alert if the number of events of disrupted phase within a first predetermined length of time exceeds a predetermined threshold value,
the predetermined threshold value being at least two, the first predetermined length of time being at least one minute and an event of disrupted phase occurring if the range of variation of the break-up phase within a second predetermined length of time is equal to or greater than a preset phase difference,
the second predetermined length of time being no greater than a half of the first predetermined length of time and the preset phase difference being at least 45° or a number of possible phase positions that cover at least 45° in phase.

13. A monitoring system according to claim 12, wherein at least one selected from the set comprising:
the preset phase difference is at least 67.5° or a number of possible phase positions that cover at least 67.5° in phase;
the preset phase difference is at least 90° or a number of possible phase positions that cover at least 90° in phase; and
the preset phase difference is at least 135° or a number of possible phase positions that cover at least 135° in phase.

14. A monitoring system according to claim 12, wherein the predetermined threshold value is at least three and the second predetermined length of time is no greater than a third of the first predetermined length of time.

15. A monitoring system according to claim 12, wherein the second predetermined length of time is at least 5 seconds and no more than 5 minutes.

16. A monitoring system according to claim 1, wherein the alert includes a diagnosis that there is or may be a partial blockage at a jet-forming device of the printer and/or a proposal of action that should be taken.

17. A monitoring system according to claim 16, wherein the alert includes the proposal of action that should be taken and the content of the proposal depends at least in part on the content of a proposal in one or more previous alerts.

18. A monitoring system according to claim 1, wherein the processor and memory are external to the printer, such that the monitoring system is a remote monitoring system.

19. A monitoring system of claim 1, wherein the processor and memory are included in an electrostatic deflection continuous ink jet printer.

20. A monitoring method comprising:
receiving printer data of an electrostatic deflection continuous ink jet printer and obtaining phase data from said printer data, said phase data being data (a) indicating which of a set of possible phase positions includes the break-up phase of an ink jet of the printer at each of a succession of analysis times and/or (b) indicating the change of the break-up phase of the ink jet from one of the possible phase positions to another; and
analysing the phase data, using at least one of: (a) the size, in number of possible phase positions or in angle of phase, of changes in break-up phase from one analysis time to the next; (b) the range of variation of the break-up phase within a set period of time; or (c) whether successive changes in phase are in the same direction as each other, to determine whether the break-up phase is unstable and outputting an alert in response to a determination that the break-up phase is unstable.

21. A monitoring method according to claim 20, further comprising obtaining other data from the printer data, said other data being data relating to an operation other than forming the ink jet at a jet-forming device of the printer and/or data relating to a detected state, or a change in a detected state, in the printer other than the break-up phase;
and in which, under predetermined circumstances that are indicated to be present by the other data, a said alert is not output or the phase data or the manner of analysing the phase data is compensated for the predicted effect of the predetermined circumstances on the break-up phase.

* * * * *